US011874653B2

(12) United States Patent
Graham et al.

(10) Patent No.: US 11,874,653 B2
(45) Date of Patent: Jan. 16, 2024

(54) SYSTEMS AND METHODS OF SERVICING EQUIPMENT

(71) Applicants: General Electric Company, Schenectady, NY (US); Oliver Crispin Robotics Limited, Altrincham (GB)

(72) Inventors: Andrew Crispin Graham, Badminton (GB); David Scott Diwinsky, West Chester, OH (US)

(73) Assignees: Oliver Crispin Robotics Limited, Altrincham (GB); General Electric Company, Schenectady, NY (US)

( * ) Notice: Subject to any disclaimer, the term of this patent is extended or adjusted under 35 U.S.C. 154(b) by 62 days.

(21) Appl. No.: 17/083,658

(22) Filed: Oct. 29, 2020

(65) Prior Publication Data
US 2022/0137614 A1 May 5, 2022

(51) Int. Cl.
*G05B 23/02* (2006.01)
*B23P 6/00* (2006.01)
*F01D 5/00* (2006.01)

(52) U.S. Cl.
CPC .......... *G05B 23/0283* (2013.01); *B23P 6/002* (2013.01); *F01D 5/005* (2013.01); *G05B 23/0262* (2013.01); *G05B 23/0267* (2013.01)

(58) Field of Classification Search
CPC ..... F01D 5/005; B23P 6/002; G05B 23/0283; G05B 23/0262; G05B 23/0267
See application file for complete search history.

(56) References Cited

U.S. PATENT DOCUMENTS

| 5,758,298 | A | 5/1998 | Guldner |
| 6,272,865 | B1 | 8/2001 | Clark et al. |
| 6,376,801 | B1 * | 4/2002 | Farrell ................ F01D 5/005 901/42 |
| 6,559,813 | B1 | 5/2003 | DeLuca |
| 7,925,454 | B1 | 4/2011 | Narcus |
| 8,061,142 | B2 | 11/2011 | Kastmp et al. |

(Continued)

FOREIGN PATENT DOCUMENTS

| EP | 0628477 | 12/1994 |
| EP | 1225307 | 7/2002 |

(Continued)

OTHER PUBLICATIONS

Coulter et al., A System for Telerobotic Control of Servicing Tasks in a Nuclear Steam Generator, CMU-RI-TR-90-24, Robotics Institute, Carnegie Mellon University, Pennsylvania, Dec. 1990, 16 Pages. https://www.ri.cmu.edu/publications/a-system-for-telerobotic-control-of-servicing-tasks-in-a-nuclear-steam-generator/.

(Continued)

*Primary Examiner* — Aditya S Bhat
(74) *Attorney, Agent, or Firm* — Fitch, Even, Tabin & Flannery LLP

(57) ABSTRACT

A method of servicing equipment, the method comprising: recording information associated with servicing of the equipment in view of a workscope at a first location; sending the recorded information to a node; receiving service input from a third party located at a second location different from the first location, the third party having prepared the service input in response to the recorded information on the node; and performing the service using the received service input.

17 Claims, 14 Drawing Sheets

(56) References Cited

U.S. PATENT DOCUMENTS

| | | | |
|---|---|---|---|
| 8,312,724 B2 | 11/2012 | Dai et al. | |
| 8,390,534 B2* | 3/2013 | Hamadou | G06T 7/20 |
| | | | 382/103 |
| 8,640,942 B1 | 2/2014 | Ozbaysal | |
| 9,745,936 B2 | 8/2017 | Ryon et al. | |
| 9,920,932 B2 | 3/2018 | Dai et al. | |
| 10,054,312 B2 | 8/2018 | Dai et al. | |
| 10,252,178 B2 | 4/2019 | Reid | |
| 10,311,833 B1 | 6/2019 | Qiu | |
| 10,366,521 B1 | 7/2019 | Peacock | |
| 10,964,130 B1 | 3/2021 | Dixit | |
| 11,067,592 B2* | 7/2021 | Hurst | G01P 13/02 |
| 11,214,437 B1 | 1/2022 | Ebrahimi Afrouzi | |
| 11,235,890 B1 | 2/2022 | Dahlstrom | |
| 11,504,813 B2 | 11/2022 | Whittle | |
| 2004/0034456 A1 | 2/2004 | Felke | |
| 2006/0042083 A1 | 3/2006 | Baker | |
| 2007/0273610 A1 | 11/2007 | Baillot | |
| 2008/0040872 A1 | 2/2008 | Hjerpe | |
| 2008/0173624 A1* | 7/2008 | Drechsler | F01D 5/005 |
| | | | 219/137 R |
| 2009/0120094 A1 | 5/2009 | Norster | |
| 2009/0178417 A1 | 7/2009 | Draper | |
| 2009/0312956 A1 | 12/2009 | Zombo | |
| 2010/0033404 A1 | 2/2010 | Hamadou | |
| 2011/0077548 A1 | 3/2011 | Torch | |
| 2011/0196593 A1 | 8/2011 | Jiang | |
| 2012/0069051 A1 | 3/2012 | Hagbi | |
| 2012/0075343 A1 | 3/2012 | Chen | |
| 2012/0152877 A1 | 6/2012 | Tadayon | |
| 2012/0167388 A1 | 7/2012 | Black | |
| 2012/0191496 A1 | 7/2012 | Muench | |
| 2013/0083063 A1 | 4/2013 | Geisner | |
| 2013/0103193 A1 | 4/2013 | Roberts | |
| 2013/0113913 A1 | 5/2013 | Scheid | |
| 2014/0063054 A1 | 3/2014 | Osterhout | |
| 2015/0183117 A1 | 7/2015 | Oda | |
| 2015/0269792 A1 | 9/2015 | Wood | |
| 2015/0283654 A1* | 10/2015 | Ernst | G05B 19/4097 |
| | | | 29/889.1 |
| 2015/0309316 A1 | 10/2015 | Osterhout | |
| 2016/0129592 A1 | 5/2016 | Saboo | |
| 2016/0195390 A1 | 7/2016 | Nissen | |
| 2016/0328887 A1 | 11/2016 | Elvezio | |
| 2017/0057081 A1 | 3/2017 | Krohne | |
| 2017/0102711 A1 | 4/2017 | Watts | |
| 2017/0293275 A1 | 10/2017 | Reddish | |
| 2017/0370220 A1 | 12/2017 | Morris | |
| 2018/0013959 A1 | 1/2018 | Slavens | |
| 2018/0100369 A1 | 4/2018 | Perkins | |
| 2018/0100396 A1 | 4/2018 | Lipkin | |
| 2018/0109083 A1 | 4/2018 | Fenker | |
| 2018/0128134 A1 | 5/2018 | Kaushik | |
| 2018/0149038 A1 | 5/2018 | Eriksen | |
| 2018/0195728 A1 | 7/2018 | Caruso et al. | |
| 2018/0286034 A1 | 10/2018 | Lim | |
| 2019/0032508 A1 | 1/2019 | Wang | |
| 2019/0054638 A1 | 2/2019 | Norton | |
| 2019/0070730 A1 | 3/2019 | Morioka | |
| 2019/0146000 A1 | 5/2019 | Hurst | |
| 2019/0146436 A1 | 5/2019 | Perez Zarate | |
| 2019/0147412 A1 | 5/2019 | Chiaramonte | |
| 2019/0168388 A1 | 6/2019 | Pringle, IV | |
| 2019/0186292 A1 | 6/2019 | Lee | |
| 2019/0291953 A1 | 9/2019 | Manley | |
| 2019/0294883 A1 | 9/2019 | Pathak | |
| 2019/0308319 A1 | 10/2019 | Walters | |
| 2019/0324430 A1 | 10/2019 | Herzog | |
| 2019/0338666 A1 | 11/2019 | Finn | |
| 2019/0340742 A1 | 11/2019 | Finn | |
| 2020/0027354 A1 | 1/2020 | Goldman | |
| 2020/0182744 A1 | 6/2020 | Axinte | |
| 2020/0210967 A1 | 7/2020 | Price | |
| 2020/0223069 A1 | 7/2020 | Tan | |
| 2020/0223568 A1 | 7/2020 | Nicholson | |
| 2020/0224552 A1 | 7/2020 | Millhaem | |
| 2020/0263396 A1 | 8/2020 | Clarke | |
| 2020/0327743 A1 | 10/2020 | Cannarsa | |
| 2021/0095649 A1 | 4/2021 | Furushou | |
| 2021/0116256 A1 | 4/2021 | Konrardy | |
| 2021/0129326 A1 | 5/2021 | Do | |
| 2022/0076407 A1 | 3/2022 | Nayeri | |
| 2022/0134561 A1 | 5/2022 | Graham | |
| 2022/0134562 A1 | 5/2022 | Graham | |
| 2022/0135006 A1 | 5/2022 | Graham | |
| 2022/0135253 A1 | 5/2022 | Graham | |
| 2022/0135254 A1 | 5/2022 | Graham | |
| 2022/0136405 A1 | 5/2022 | Graham | |
| 2022/0136406 A1 | 5/2022 | Graham | |
| 2022/0138699 A1 | 5/2022 | Graham | |
| 2022/0139120 A1 | 5/2022 | Graham | |

FOREIGN PATENT DOCUMENTS

| | | |
|---|---|---|
| EP | 2881731 | 6/2015 |
| EP | 3483686 | 5/2019 |
| EP | 3483800 | 5/2019 |
| EP | 3493128 | 6/2019 |
| EP | 3667277 | 6/2020 |
| EP | 3680058 | 7/2020 |
| EP | 3689526 | 8/2020 |
| JP | H11157497 | 6/1999 |
| JP | 2015124496 A | 7/2015 |

OTHER PUBLICATIONS

Guo et al., Multimodal Image Analysis in Tissue Diagnostics for Skin Melanoma, Journal of Chemometrics, ResearchGate, Nov. 2017. (Abstract Only) https://www.researchgate.net/publication/3211081822_Multimodal_image_analysis_in_the_tissue_diagnostics_for_skin_melanoma.

Yang et al., Using Artificial Intelligence to Improve Quality Control, Quality Magazine, 7 Pages. http://www.qualitymag.com/blogs/14-quality-blog/post/94190-using-artificial-intelligence-to-improve-quality-control.

"Assembly, quality control, ergonomics . . . How Safran is robotizing its factories", Apr. 7, 2022, 3 pgs., Web Address: https://www.usinenouvelle.com/editorial/l-instant-tech-assemblage-controle-qualite-ergonomie-comment-safran-robotise-ses-usines.N1803452.

"Pratt & Whitney Pilots Cobots, Sensing Technology for MRO", Feb. 16, 2022, 2 pgs., Web Address: https://aviationweek.com/shownews/singapore-airshow/pratt-whitney-pilots-cobots-sensing-technology-mro?elqTrackId=9CDA4A84B8191279355616D383D2336B&elq=9ad40511af03424eab62a23fc122680c&elqaid=31640&elqat=1&elqCampaignId=26870&utm_rid=CPEN1000001187300&utm_campaign=31640&utm_medium=email&elq2=9ad40511af03424eab62a23fc122680c&utm_emailname=AW_News_MRO_20220217.

Deep Learning Vs. Machine Vision and Human Inspection, COGNEX. (4 pgs); https://www.cognex.com/what-is/deep-learning/deep-learning-vs-machine-vision-and-human-inspection.

General Electric, Reliable Robotic Solutions for Improved Safety, Productivity & Quality, (14 pgs); https://inspection-robotics.com/.

OC Robotics, Robotic Solutions for Confined and Hazardous Environments, Bristol, UK. (3 pgs.); www.ocrobotics.com.

Tharp et al., Virtual Window Telepresence System for Telerobotic Inspection, Proceedings of SPIE, 2351.1, 1995, pp. 366-373. ; https://www.deepdyve.com/lp/spie/virtual-window-telepresence-system-for-telerobotic-inspection-2nmfmmpOx.

U.S. Appl. No. 17/083,546; Non-Final Rejection dated Nov. 18, 2022; (pp. 1-19).

U.S. Appl. No. 17/083,693; Non-Final Rejection dated Aug. 18, 2022; (pp. 1-44).

U.S. Appl. No. 17/083,718; Final Rejection dated Dec. 9, 2022; (pp. 1-39).

U.S. Appl. No. 17/083,718; Non-Final Rejection dated Aug. 12, 2022; (pp. 1-33).

(56) References Cited

OTHER PUBLICATIONS

U.S. Appl. No. 17/083,753; Non-Final Rejection dated Sep. 6, 2022; (pp. 1-15).

Wang et al., A Multimodal Machine Vision System for Quality Inspection of Onions, Journal of Food Engineering, ScienceDirect, vol. 166, Dec. 2015, pp. 291-301. (Web Link Only) https://www.sciencedirect.com/science/article/abs/pii/S0260877415002824.

Allesandro "Advisory Circular: General Type Certification Guidelines for Turbine Engines" (Year: 2013), (10 pgs).

U.S. Appl. No. 17/083,753; Final Rejection dated Dec. 21, 2022; (pp. 1-20).

U.S. Appl. No. 17/083,796; Non-Final Rejection dated Dec. 29, 2022; (pp. 1-14).

U.S. Appl. No. 17/083,573; Non-Final Rejection dated Jan. 18, 2023; (pp. 1-16).

U.S. Appl. No. 17/083,693; Notice of Allowance and Fees Due (PTOL-85) dated Jan. 20, 2023; (pp. 1-5).

USPTO; U.S. Appl. No. 17/083,546; Non-Final Rejection dated Jun. 1, 2023; (pp. 1-11).

USPTO; U.S. Appl. No. 17/083,718; Notice of Allowance and Fees Due (PTOL-85) dated Jun. 13, 2023; (pp. 1-5).

USPTO; U.S. Appl. No. 17/083,830; Non-Final Rejection dated Jun. 13, 2023; (pp. 1-22).

Fraunhofer "Autonomous 3D scanner supports individual manufacturing processes" (Year: 2018).

USPTO; U.S. Appl. No. 17/083,546; Final Rejection dated Mar. 16, 2023; (pp. 1-17).

USPTO; U.S. Appl. No. 17/083,718; Non-Final Rejection dated Mar. 1, 2023; (pp. 1-19).

USPTO; U.S. Appl. No. 17/083,753; Non-Final Rejection dated Mar. 29, 2023; (pp. 1-15).

USPTO; U.S. Appl. No. 17/083,634; Non-Final Rejection dated May 31, 2023; (pp. 1-14).

USPTO; U.S. Appl. No. 17/083,796; Final Rejection dated Jun. 21, 2023; (pp. 1-15).

USPTO; U.S. Appl. No. 17/083,796; Non-Final Rejection dated Aug. 30, 2023; (pp. 1-6).

USPTO; U.S. Appl. No. 17/083,600; Restriction Requirement dated Sep. 18, 2023; (p. 10).

USPTO; U.S. Appl. No. 17/083,546; Notice of Allowance and Fees Due (PTOL-85) dated Oct. 30, 2023; (pp. 1-10).

USPTO; U.S. Appl. No. 17/083,718; Notice of Allowance and Fees Due (PTOL-85) dated Oct. 16, 2023; (pp. 1-5).

USPTO; U.S. Appl. No. 17/083,753; Final Rejection dated Oct. 13, 2023; (pp. 1-24).

\* cited by examiner

SYSTEMS AND METHODS OF SERVICING EQUIPMENT

FIELD

The present subject matter relates generally to systems and methods of servicing equipment, and systems and methods of servicing gas turbine engines in particular.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Throughout the life of the gas turbine engine, it generally becomes necessary to inspect and/or repair one or more components of the gas turbine engine. Traditionally, the gas turbine engine must be uninstalled from a wing of an aircraft with which it is utilized and/or disassembled to expose the part needing inspection and/or repair. However, such processes may be relatively costly and time consuming.

Accordingly, improved systems and methods of servicing equipment would be useful.

BRIEF DESCRIPTION

Aspects and advantages of the invention will be set forth in part in the following description, or may be obvious from the description, or may be learned through practice of the invention.

In one exemplary aspect of the present disclosure, a method of servicing equipment comprises recording information associated with servicing of the equipment in view of a workscope at a first location; sending the recorded information to a node; receiving service input from a third party located at a second location different from the first location, the third party having prepared the service input in response to the recorded information on the node; and performing the service using the received service input.

In another exemplary aspect of the present disclosure, a computer implemented method for servicing equipment comprises in response to a step of recording information associated with the equipment at a first location and sending the recorded information to one or more nodes, accessing, at a second location different from the first location, from the one or more nodes, the recorded information; preparing service input in response to the recorded information; and sharing the prepared service input to the first location using the one or more nodes.

In another exemplary aspect of the present disclosure, a method of servicing an engine includes at a service location, inspecting the engine using an at least partially-autonomous robotic assembly; autonomously capturing information associated with the inspection; at least partially-autonomously performing, using one or more computing devices, analysis on the information to create model information; sending at least one of the information and model information to an operator located at a different location than the service location; at least partially-autonomously repairing the engine at the service location in response to service input received from the operator These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
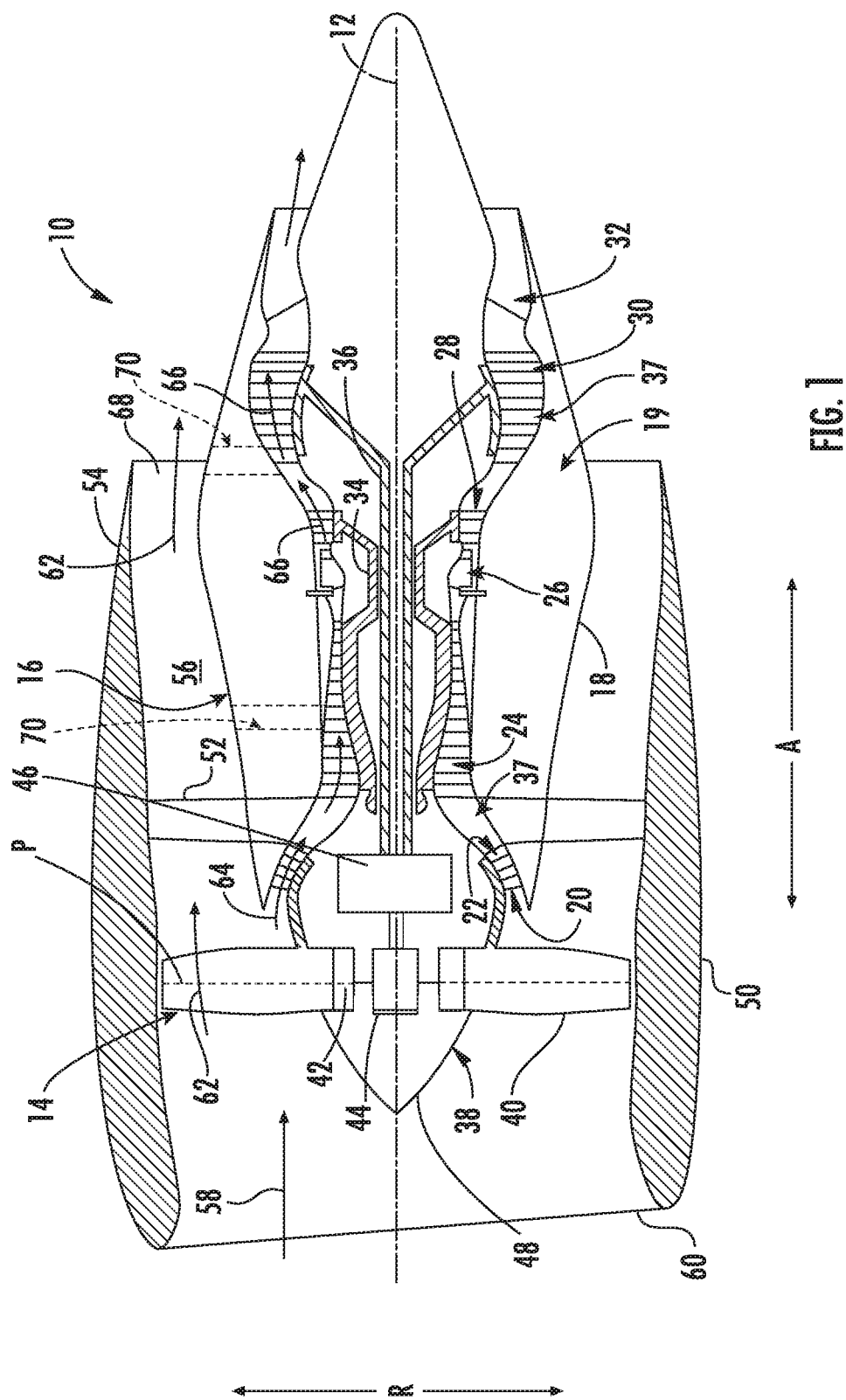
FIG. 1 is a cross-sectional schematic view of a high-bypass turbofan jet engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, affixing, or attaching, as well as indirect coupling, affixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, robotic assemblies providing autonomous, or semi-autonomous, servicing operations (including inspection and/or repair) to equipment, such as gas turbine engines, can collect information during the servicing operation which can be forwarded to one or more human operators specializing in the equipment. The information can relate to data or analysis compiled during the robotic assembly's servicing operation of the equipment. For example, the information may provide details from inspection or repair of the equipment. The human operator can examine the information and provide servicing recommendations in view thereof. The servicing recommendations can then be implemented by the robotic assembly, or one or more human operators, to complete servicing operations associated with the equipment.

Systems and methods are described herein that extend beyond the claimed systems and methods related to the inclusion of human operators within the workflow of a servicing operation. It will be appreciated that these systems and methods are provided by way of example only, and the claimed systems and methods are not limited to applications using or otherwise incorporated with these other systems and operations. The disclosure is not intended to be limiting. For example, it should be understood that one or more embodiments described herein may be configured to operate independently or in combination with other embodiments described herein.

Referring now to the drawings, FIG. 1 illustrates a high-bypass turbofan jet engine, referred to herein as a "gas turbine engine," in accordance with an embodiment. As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes an outer casing 18 that defines an annular inlet 20. Within the outer casing 18 may be considered an interior 19 of the turbomachine 16, and more specifically, of the turbofan engine 10. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 (or rather a high-pressure spool assembly, as described below) drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22, and out the aft 54 of the turbofan engine 10. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 68 of the turbofan engine 10, also providing propulsive thrust.

Moreover, it will be appreciated, that the exemplary turbofan engine 10 defines a plurality of openings. For example, the exemplary turbofan engine 10, and more specifically, turbomachine 16, defines a plurality of borescope openings 70 arranged along the axial direction A, the inlet 20, the exhaust nozzle 32, etc. Additionally, although not depicted, the turbofan engine 10, or more specifically, the turbomachine 16, may define one or more igniter openings, fuel air mixer openings, fuel nozzle openings, etc.

It will be appreciated, however, that the exemplary turbofan engine 10 depicted in FIG. 1 is provided by way of example only. In other exemplary embodiments the present disclosure, the turbofan engine 10 may have any other suitable configuration, such as any other suitable number of compressors or turbines, or any geared or direct drive system, variable pitch or fixed pitch fan, etc. Further, although depicted as a turbofan engine in FIG. 1, in other embodiments, any other suitable turbine engine may be provided. For example, in other embodiments, the turbine engine may be a turbojet engine, a turboprop engine, etc. Further, in still other exemplary embodiments of the present disclosure, the turbine engine may not be an aeronautical gas turbine engine, such as the engine depicted in FIG. 1, and instead may be, e.g., a land-based turbine engine used, e.g., for power generation, or a nautical turbine engine. Further, still, in other embodiments, any other suitable type of engine may be provided, such as a rotary engine, such as an internal combustion engine. In yet other embodiments, the engine may be any plant or machinery which, due to wear or environmental factors, experiences changes in condition and is periodically subject to servicing operations such as maintenance and/or repair.

Figure 2:
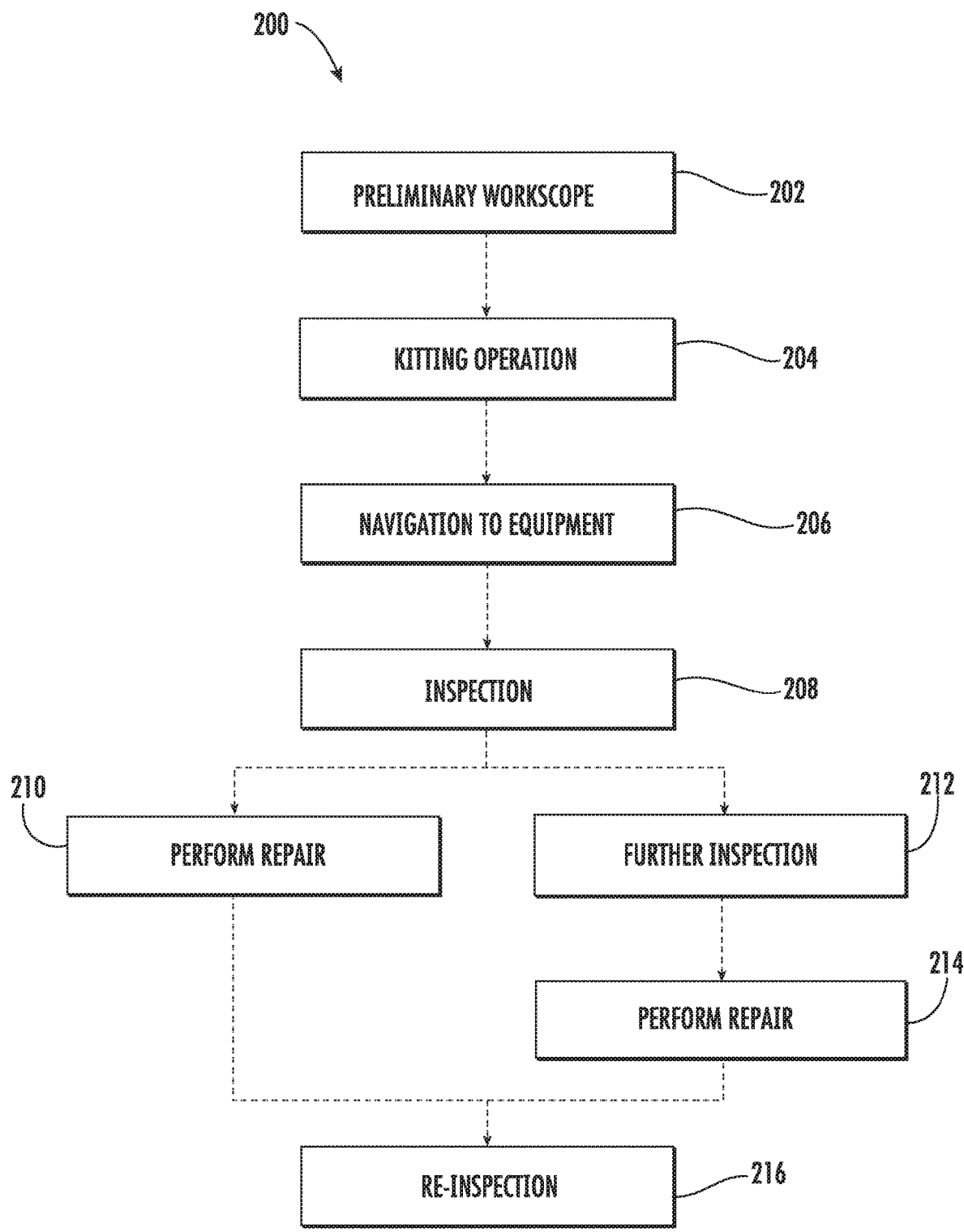
FIG. 2 is a flow chart of a method of servicing equipment in accordance with an exemplary embodiment of the present disclosure.

Equipment, such as gas turbine engines, typically require service on a routine or semi-routine basis. FIG. 2 is a flow chart illustrating an exemplary method 200 of servicing equipment in accordance with one or more embodiments described herein. Exemplary servicing operations can include inspection and repair of the equipment. With respect to aircraft gas turbine engines, servicing operations can be performed on-wing, near-wing, or at a separate location, such as at one or more dedicated or specialty repair shop(s). On-wing servicing may include servicing operations performed while the gas turbine engine is mounted on the wing of the aircraft. Near-wing servicing may include servicing operations performed with the gas turbine engine removed from the aircraft but still located nearby, e.g., on a lift or cart disposed within a servicing location at or near the aircraft. Servicing operations at separate locations may include operations at one or more service shops, e.g., where the gas turbine engine is transported from the aircraft to a separate location for servicing.

Servicing operations may be derived from workscopes defining the steps, also referred to as tasks, associated with the servicing operation. Workscopes may include, for example, information relating to the individual task(s) to be performed, orders of performing the tasks, tools required to complete the tasks, components required to complete the tasks, safety factors associated with the tasks, metrics for assessing the success or failure to correctly complete the task (e.g., after performing a servicing operation like application of a thermal barrier coating, validating whether the operation was successful within a prescribed operational tolerance), and the like. In an embodiment, at least some workscopes can be created and/or maintained by a human operator. In another embodiment, at least some workscopes can be created and/or maintained by one or more computing devices, as described hereinafter. By way of example, the one or more computing devices can utilize machine learning to create, maintain, modify, or otherwise manage the workscopes. Each workscope may be specific to a particular type of equipment, a particular model of equipment, a particular manufacturing date or age of the equipment, a particular usage of the equipment, or any combination thereof.

The workscope may include a preliminary workscope determined at least in part based on one or more last-known conditions of the equipment. These last known conditions may include, for example, one or more operator snag lists associated with the equipment, likely diagnosis analysis based on historical data and/or analysis, previous equipment servicing data including information associated with previous servicing operations, fleetwide-derived data, and the like. The preliminary workscope may be further determined in view of standard equipment workscopes (e.g., routine maintenance schedules).

The preliminary workscope may further be determined in view of the servicing context, e.g., on-wing, near-wing, and at a separate location. By way of example, while on-wing servicing may facilitate quicker turnaround times as a result of fewer operational steps, access to one or more components of the on-wing gas turbine engine may be limited or require special tooling to reach. The need for such special tooling may be considered as part of forming the preliminary workscope.

Upon receiving the preliminary workscope at step 202 of the method 200, servicing operations can include a kitting operation at step 204. In an embodiment, the preliminary workscope can describe parts and/or tooling required to perform the service. The kitting operation 204, as described in greater detail hereinafter, may include compiling kitted components, e.g., any parts and/or tooling described in the preliminary workscope. After kitting operations are completed, the method 200 can further include a step 206 where the kitted components are navigated to the equipment to be serviced. Upon arrival at the equipment, the method 200 can further include inspection of the equipment at step 208. Preliminary servicing operations, such as steps involved in preparing future servicing operations, can also be performed at such time. In response to the inspection performed at step 208, the method 200 can either include a step of performing a repair 210 or further inspection 212 based on the results from the inspection 208. Repair operations may include routine maintenance, repairing damage to the equipment, updating one or more components of the equipment, and the like. As described in greater detail hereinafter, repair 210 may be performed where the inspection reveals no unexpected issues whereas further inspection 212 may be required where unexpected issues arise or other considerations requiring further analysis are revealed. In instances where further inspection 212 is required, a step 214 of performing the repair can be completed after the further inspection at step 212. In certain instances, the step 214 of performing the repair may be different than a repair that was to be performed at step 210. Such differences may be the result of an updated workscope formed at least partially in response to the further inspection 212. After completion of the repair at one of steps 210 and 214, the method 200 can include a step 216 of re-inspecting the equipment. Where the equipment passes re-inspection and repair is complete, the equipment may be ready to return to regular use. Otherwise, one or more additional steps of inspection and/or repair may be warranted. Additionally, and as described in greater detail below, information associated with one or more steps of the method 200, e.g., inspection results, repair data, testing information, and the like, may be saved to create or modify condition profiles of the equipment and/or inform future workscopes or fleetwide analysis.

Figure 3:
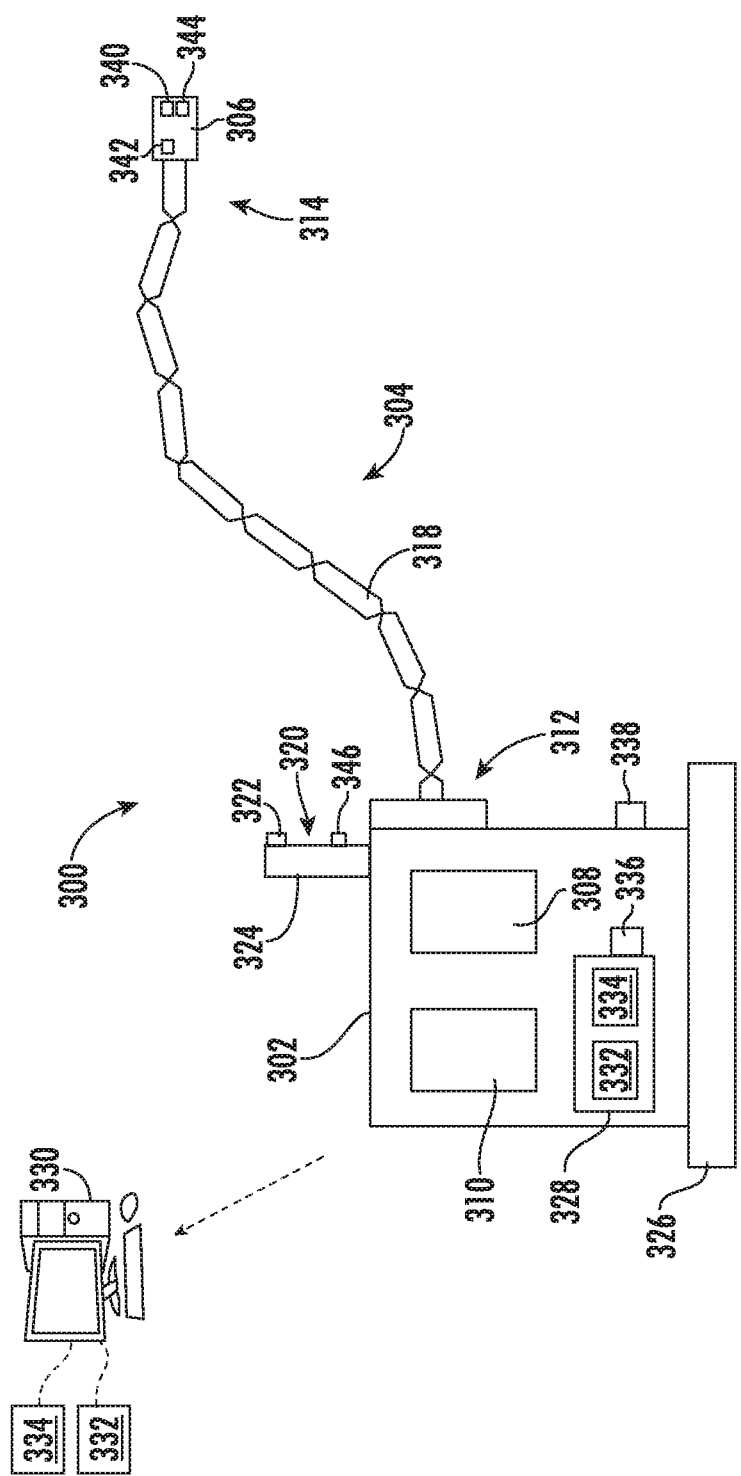
FIG. 3 is a schematic, cross-sectional view of a robotic assembly in accordance with an exemplary embodiment of the present disclosure.

FIG. 3 is a schematic view of an exemplary robotic assembly 300 for use in servicing equipment, such as the aforementioned gas turbine engine. The robotic assembly 300 can generally include a support assembly 302, a robotic arm 304, and a utility member 306. The support assembly 302 generally includes one or more motors 308 and a controller 310. The controller 310 is operably coupled to the one or more motors 308 for controlling operation of the robotic assembly 300. Additionally, the controller 310 may be operably coupled to the utility member 306 and/or one or more sensors (not shown) attached to or embedded in the robotic arm 304 and/or utility member 306. Further, the robotic arm 304 extends generally between a root end 312 and a distal end 314. The robotic arm 304 is coupled to the support assembly 302 at the root end 312 and includes the utility member 306 at the distal end 314.

It will be appreciated that the robotic arm 304 may define certain parameters to further enable it to reach the relatively remote positions within, e.g., an interior of a gas turbine engine or other remote locations of an environment. More specifically, for the embodiment shown, the robotic arm 304 defines a length between the root end 312 and the distal end 314 of least about twelve (12) inches, such as at least about thirty-six (36) inches, such as at least about forty-eight (48) inches, such as at least about sixty (60) inches, such as up to about 500 inches. Similarly, the robotic arm 304 defines a maximum diameter between the root end 312 and the distal end 314, which for the embodiment depicted is a maximum diameter of each of the individual segments 318 of the robotic arm 304, less than about five (5) inches. For example, the maximum diameter of the robotic arm 304 may be less than about three (3) inches, such as less than about 2.5 inches, such as less than about one (1) inch. Such may further allow the robotic arm 304 to reach the relatively remote locations desired. In an embodiment, the robotic assembly 300 can include a system (not illustrated) that is configured to monitor the robotic arm 304, or one or more locations thereof, e.g., the distal end 314 of the robotic arm 304 or an assembly held or contained by or at the distal end 314. The system can further compensate for relative motion between the robotic arm 304, or the one or more locations thereof, and the equipment.

Robotic assemblies 300 described in accordance with one or more embodiments may operate autonomously, i.e., without human interaction. Autonomous operation may occur through programming robotic instructions which may be executed by the robotic assembly. Autonomous operation may involve decision making, e.g., choices on sensor inputs, internal parameters, and the like, at least in part without further support by a human operator. The actions performed and outcomes are at least in part dependent on those autonomous made decisions by the robotic assembly 300. Robotic assemblies 300 described in accordance with other embodiments may operate at least partially-autonomously, i.e., with minimum human operation. For example, initial instructions may be executed with further human input and decision making in addition to local, autonomous decision making by the robotic assembly. Robotic assemblies 300 described in accordance with yet other embodiments may operate under human control. For example, the robotic assembly 300 can be operated by a human operator located within a common environment or at a remote environment (e.g., at least 0.25 miles away, at least 1 mile away, at least 5 miles away, at least 10 miles away, at least 25 miles away, at least 100 miles away, at least 1000 miles away). Reference made herein with respect to autonomous, semi-autonomous, and human operated robotic assemblies may be used interchangeably. In particular embodiments, however, the robotic assembly 300 is at least partially-autonomous, such as fully autonomous.

The robotic assembly 300 can further include an environmental capture device 320. It will be appreciated that the environmental capture device 320 may provide one or more functions to the robotic assembly 300. By way of example, the environmental capture device 320 may be configured to capture information, e.g., a visual feed, of the gas turbine engine while being serviced. The environmental capture device 320 may further be configured to capture information of the environment in which the gas turbine engine is disposed. For example, the environmental capture device 320 may be configured to capture information associated with movement of the robotic assembly 300 between two or more points within the environment, such as between a kitting station and the gas turbine engine. In an embodiment, the information can be processed by one or more computing devices 328 and/or 330 (described hereinafter) for the purpose of performing the servicing operation (i.e., service and/or repair) and/or for navigating the robotic assembly 300 through the environment, e.g., to the gas turbine engine from a remote location or relative to the gas turbine engine during the servicing operation.

In an embodiment, the environmental capture device 320 can include one or more cameras 322 and a mount 324. The camera(s) 322 and mount 324 may be dynamically coupled together, such as rotatably coupled, pivotably coupled, telescopically coupled, retractably coupled, or the like. In an embodiment, the camera(s) 322 and mount 324 may be repositionable through activation of one or more motors (not illustrated). The one or more motors may be configured to operate autonomously, or semi-autonomously, so as to maintain the information in a desired direction relative to the robotic assembly and/or to the environment and/or gas turbine engine. In an embodiment, the information can capture a wide-angle view of the environment, a narrow field of view, or be adjustable between wide and narrow fields of view. In one exemplary embodiment, the information can be configured to capture all, or substantially all, 360 degrees in at least a lateral plane of the robotic assembly 300.

In an embodiment, the environmental capture device 320 can include a thermal imaging device. In another embodiment, the environmental capture device 320 can include one or more passive and/or active scanners, digital cameras, charge-coupled devices (CCD), infrared sensors, complementary metal oxide semiconductors, ultrasound imaging devices, photoacoustic devices, magnetic resonance imaging devices, sound navigation ranging (sonar), radio detection ranging (radar), light detection ranging (lidar), inductive and/or capacitive proximity sensing, touch sensors (e.g., microswitches, sensorized whiskers or bumpers, physical displacement sensors (e.g., potentiometers), linear variable differential transformer (LVDT, or the like. In certain instances, the environmental capture device 320 can include a plurality of devices, each having same, similar, or different functionality or spatial alignment. The environmental capture device 320 may be in electronic communication with the one or more computing devices 328 and/or 330 and may be configured to transmit information, or one or more output signals having information associated with the servicing operation, to the one or more computing devices 328 and/or 330.

In many embodiments, the robotic assembly 300 further includes means of locomotion, a drive assembly 326 configured to move the robotic assembly 300 relative to the environment. The drive assembly 326 can include one or more of omniwheels, mecanum wheels, wheels, castors, tracks, treads, skids, moveable arms, movable legs and the like coupled with one or more power generators, such as motors, engines, and the like. The drive assembly 326 may be in electronic communication with the one or more computing devices 328 and/or 330. By way of exemplary embodiment, the one or more computing devices 328 and/or 330 may be configured to send information to the drive assembly 326 corresponding to repositioning instructions or a coordinate gridwork to navigate the robotic assembly 300.

In another exemplary embodiment, the one or more computing devices 328 and/or 330 may provide repositioning task descriptions rather than linear, programmatic instructions. For instance, the one or more computing devices 328 and/or 330 may instruct the drive assembly 326 to reposition the robotic assembly 300 to a specific location without description of the environment. By way of example, the one or more computing devices 328 and/or 330 may instruct the robotic assembly 300 to position itself at a prescribed distance from a specific part of a particular piece of equipment being serviced (e.g. "position 1.5 meters aft of engine number two on aircraft with tail number N123AB"). The drive assembly 326 can be configured to move the robotic assembly 300 in view of the received information. As described in greater detail below, repositioning instructions can include initial positioning instructions, i.e., for moving the robotic assembly 300 initially to the gas turbine engine, and/or repositioning instructions, i.e., for repositioning the robotic assembly 300 relative to the gas turbine engine during a servicing operation.

In some embodiments, the one or more computing devices includes one or more local computing device 328. The local computing device(s) 328 may be disposed locally on the robotic assembly 300 or contained within an environment of the equipment. In other embodiments, the one or more computing devices includes one or more remote devices 330. For example, the remote device(s) 330 can include one or more nodes (e.g., virtual nodes), servers, or other off-site computing devices configured to communicate with the robotic assembly 300 or other node(s) in the service environment. The node can include, for example, an information linkage point such as along a wireless transmission path, a wired transmission path, or the like. Exemplary nodes include user device interfaces, server interfaces, equipment interfaces, and the like. The remote computing devices 330 can communicate with the robotic assembly 300 through one or more wireless protocol standards. In yet other embodiments, the one or more computing devices can be split between one or more local computing device(s) 328 and one or more remote computing devices 330. That is, the one or more computing devices can include a combination of local and remote computing devices. The local and remote computing devices can work in concert or perform different processing operations described herein, such as autonomous, or semi-autonomous, processing.

Figure 20:
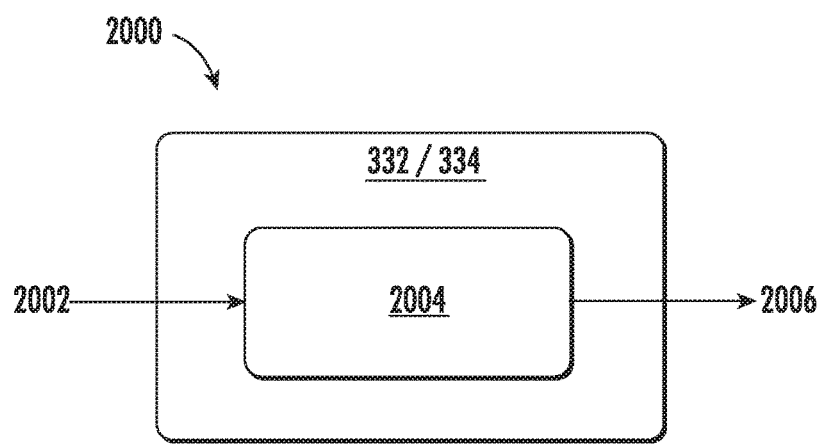
FIG. 20 is an example implementation of a machine-learned model in accordance with an exemplary embodiment of the present disclosure.

The one or more computing devices 328 and/or 330 can include instructions stored on computer-readable storage devices 332. The instructions can be read and executed by at least one processing element 334. The processing element 334 can be any suitable processing device (e.g., a processor core, a microprocessor, an ASIC, a FPGA, a controller, a microcontroller, etc.) and can be one processor or a plurality of processors that are operatively connected. By way of example, the computer-readable storage devices 332 can include one or more non-transitory computer-readable storage media, such as RAM, ROM, EEPROM, EPROM, one or more memory devices, flash memory devices, etc., and combinations thereof. The computer-readable storage devices 332 can store information that can be accessed by the processing element 334. The instructions can be software written in any suitable programming language or can be implemented in hardware. Additionally, or alternatively, the instructions can be executed in logically and/or virtually separate threads on the processing element 334. According to an aspect of the present disclosure, the one or more computing devices 328 and/or 330 can store or include one or more models 2004 (FIG. 20). As examples, the models 2004 can include various machine-learned models such as, for example, models utilizing boosted random forest techniques, support vector machines, neural networks (e.g., deep neural networks), or other multi-layer non-linear models. Example neural networks include feed-forward neural networks, recurrent neural networks (e.g., long short-term memory recurrent neural networks), convolutional neural networks, or other forms of neural networks. In an embodiment, the models 2004 can implement multiple parallel instances of a single model (e.g., to perform parallel action determinations across multiple instances for a single determination).

In an embodiment, the robotic assembly 300 can further include one or more wireless communication elements 336. The wireless communication elements 336 can include circuitry and one or more transceivers for transmitting and receiving signals. The wireless communication elements 336 can further include antenna(s), processing circuitry and memory to perform the wireless communication operations described herein.

In an embodiment, the robotic assembly 300 can communicate peer-to-peer with other robotic assemblies 300, for example, within a shared environment, between two or more remote locations, or between one shared assembly housing a plurality of independent robotic assemblies 300. In such a manner, the robotic assemblies 300 can operate in view of one another. By way of example, through peer-to-peer communication, multiple robotic assemblies 300 may be able to communicate and co-navigate pathways wide enough for only one robotic assembly to pass at a time. Peer-to-peer communication may further allow simultaneous servicing with real-time information sharing and/or delayed service information communicated between the robotic assemblies 300 performing the services. Using peer-to-peer communication can further facilitate easier kitting operations, inter-assembly scheduling of movement, and the like. By way of another example, the robotic assembly 300 can communicate with a secondary robot coupled with, e.g., mounted to, the robotic assembly 300. In certain instances, the secondary robot can operate independent of the robotic assembly 300, or at least partially-independent of the robotic assembly 300.

In certain scenarios, the robotic assembly 300 may be configured to operate within human-populated environments. By way of example, airplane hangars typically include human operators working to service airplanes and their components. Use of robotic assemblies 300 within such environments may create a hazardous work environment. Accordingly, in an embodiment, the robotic assembly 300 can be configured to safely operate within the environment by using the environmental capture device 320 or another element of the robotic assembly 300 to detect the presence and/or proximity of humans, e.g., within a prescribed proximity to the robotic assembly 300. When the robotic assembly 300 detects humans within a prescribed proximity, one or more operations of the robotic assembly 300 may be autonomously adjusted to create a safer environment. For example, when navigating through the environment within a prescribed proximity to humans, e.g., within ten feet of a human worker, the drive assembly 326 may operate at a slower (safe) speed. If typical operational speed through the environment is 1 meter/second, the safe speed (e.g., when within the prescribed proximity of humans) may be less than 0.1 meter/second. In an embodiment, the safe speed can be less than 90% typical speed, such as less than 80% typical speed, such as less than 70% typical speed, such as less than 60% typical speed, such as less than 50% typical speed, such as less than 40% typical speed. Similarly, the speed of the robotic arm 304 may be different when operating within a prescribed proximity of humans. Upon the occurrence of a condition, e.g., the human is no longer within the prescribed proximity of the robotic assembly 300, the robotic assembly 300 can return to normal operating conditions, e.g., normal (typical) speed.

With the preliminary workscope formed, the robotic assembly 300 can be equipped with kitted components, including parts and/or tooling, as described in the preliminary workscope so as to perform a servicing operation associated with the preliminary workscope. Parts may include items other than tools configured to be used in the servicing operation, e.g., lubricants, fasteners, clips, belts, seals, and the like. Parts may include replacement components for the equipment 706. Additionally, or alternatively, parts may include sprayable coating materials, cleaners, conditioners, welding material, brazing material, and the like. Tooling may include one or more single-use and/or reusable tools which can be used to perform the servicing operation. Exemplary tooling includes wrenches, drills, blowers, lights, scanners, blades, saws, brushes, dryers, measurement devices, pumps, sanders, polishers, ablating devices, welders, applicators and dispensers, robotic sensors, robotic tools, and the like.

Figure 4:
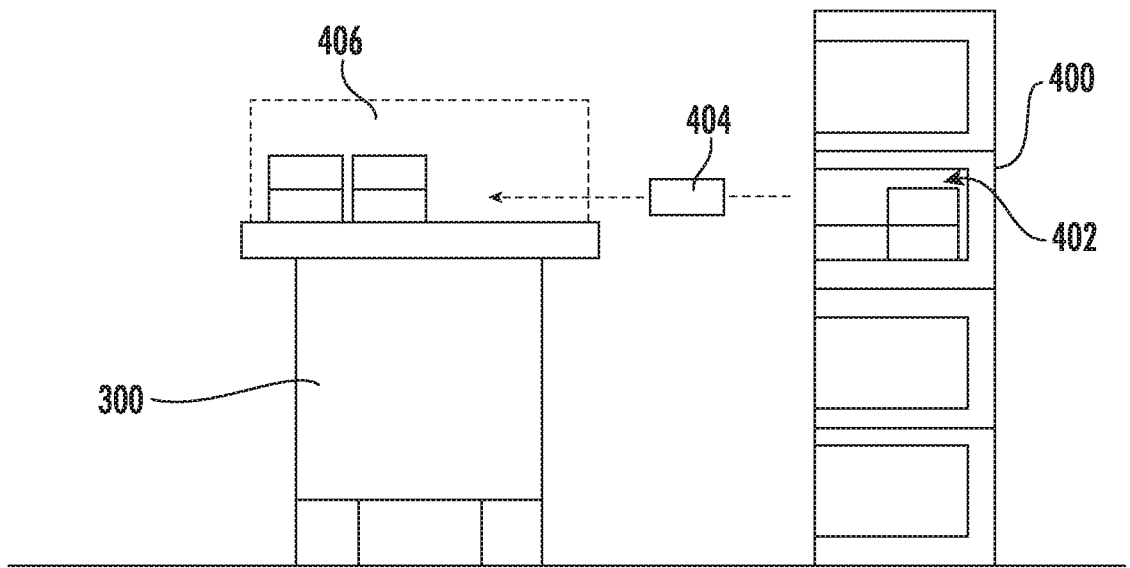
FIG. 4 is a schematic side view of a robotic assembly interfacing with a kitting station in accordance with an exemplary embodiment of the present disclosure.

FIG. 4 is a schematic view of a robotic assembly 300 interfacing with a kitting station 400. The kitting station 400 includes a storage area 402 configured to temporarily store kitted components including one or more parts and/or tooling 404 that may be utilized by the robotic assembly 300 in servicing the equipment, such as the previously described gas turbine engine. As illustrated, the storage area 402 can include any number of racks, bins, trays, shelves, stations, or the like configured to store tools and/or components 404. The storage areas 402 can be autonomously maintained and organized or may be maintained and/or organized with the assistance of human interfacing.

In an embodiment, the robotic assembly 300 and kitting station 400 can be in communication with one another. For example, the robotic assembly 300 and kitting station 400 may wirelessly communicate with one another (directly or indirectly) so as to cause the kitting station 400 to supply (kit) the robotic assembly 300 with one or more parts and/or tooling 404. Such kitting operations may correspond with one or more preliminary or non-preliminary (updated) workscopes associated with the servicing operation of the gas turbine engine. For instance, by way of non-limiting example, servicing a valve of the gas turbine engine may require special tooling for accessing and inspecting the valve and special components, and parts, such as consumables, e.g., fluids, wipes, sprays, cleaning materials, and the like, and/or replacement parts to repair the valve. A workscope associated with the valve servicing operation can include a description of the required parts and/or tooling 404 to complete the servicing operation. Accordingly, the kitting operation may include a step of providing the robotic assembly 300 with at least some of the parts and/or tooling 404 to complete the servicing operation.

The workscope may be communicated from the robotic assembly 300 to the kitting station 400, from the one or more computing devices 328 and/or 330 to the kitting station 400, another remote or local component or instrument, or any combination thereof. In an embodiment, the preliminary or updated workscope may include loading instructions associated with a loading configuration of the one or more parts and/or tooling 404 within a kitting area 406 of the robotic assembly 300. By way of example, the loading instructions may be determined based on the order of operations to be performed during the service, such that highly important equipment is disposed nearest to the robotic arm 304, in view of special handling instructions, the like, or any combination thereof.

The kitting area 406 may include a receiving area of the robotic assembly 300 configured to receive one or more parts and/or tooling 404, e.g., from the kitting station 400. In an embodiment, the kitting area 406 can include a single receiving area. In another embodiment, the kitting area 406 can include a plurality of discrete receiving areas. For instance, the kitting area 406 can include discrete first and second kitting areas each having a predetermined functionality or storage capability. For example, the first kitting area may be a general receiving area for basic tools whereas the second kitting area is configured to hold one or more parts and/or tooling at, or within, a prescribed condition, such as at a prescribed temperature. In an embodiment, at least one of the robotic assembly 300 and kitting area 406 may include one or more sensors, cameras, detectors, or the like (not illustrated) for monitoring the kitting area 406 and/or the one or more parts and/or tooling 404 contained therein.

In certain instances, loading instructions associated with the loading configuration in the kitting area 406 can include a prescribed spatial arrangement of the parts and/or tooling 404, order of loading, or both. By way of example, certain tooling may be oriented at prescribed angles at predetermined locations within the kitting area 406 such that the robotic assembly 300 can access and utilize the tooling.

In an embodiment, the robotic assembly 300 may be configured to determine the location of parts and/or tooling 404 relative to the kitting area 406. For example, the robotic assembly 300 may include a sensor or detector configured to locate desired parts and/or tooling 404 within the kitting area 406 and autonomously access and remove the desired parts and/or tooling 404 therefrom. In another embodiment, this step may be performed at least in part with the assistance of the environmental capture device 320. The determination of location may further include the identification of angular orientations of the parts and/or tooling 404 within the kitting area 406 or appropriate interfacing locations along the parts and/or tooling 404 (e.g., identifying a tool handle or a grippable portion of a component).

Determining the location of parts and/or tooling 404 may further require use of the environmental capture device 320. By capturing images of the parts and/or tooling 404 as they enter the kitting area 406 using the environmental capture device 320, it may be possible to map the parts and/or tooling 404 relative to the kitting area 406. The mapped locations of parts and/or tooling 404 can then be used to locate the parts and/or tooling 404 when required during the servicing operation.

In the embodiment shown in FIG. 4, the kitting station 400 includes a plurality of storage areas each holding tooling and/or components 404 associated with one or more workscopes. The plurality of storage areas is shown in a stacked configuration. In other embodiments, the kitting station 400 can include a plurality of different stacked or non-stacked configurations disposed at one or more locations to which the robotic assembly 300 can access.

The individual storage areas can be sorted, for example, by object type, size, shape, frequency of use, or the like. In an embodiment, the individual storage areas can each be configured to store the exact parts and/or tooling required for a particular workscope. In this regard, the robotic assembly 300 can be fully kitted by one individual storage area. In another embodiment, the individual storage areas can house kitted components in another prescribed arrangement.

In an embodiment, the kitting station 400 may be disposed within the same environment as the equipment to be serviced, e.g., in the same hangar as the gas turbine engine being serviced. Alternatively, at least part of the kitting station 400, such as the entire kitting station 400, can be disposed at a discrete location separate from the environment housing the equipment. For instance, the equipment can be disposed in a first building and the kitting station 400 can be disposed in a second building different than the first building. The robotic assembly 300 can be configured to navigate between the first and second buildings to access the kitting station 400 and return to the equipment for the servicing operation.

In certain embodiments, the kitting station 400 may be spread across two or more different locations. In such instances, the robotic assembly 300 may travel between multiple kitting stations 400 to fully kit the kitting area 406 in preparation for the servicing operation. Alternatively, one or more auxiliary equipment(s) can be configured to partially kit parts and/or tooling 404 associated with the workscope and rendezvous with the robotic assembly 300 at one or more handoff locations where multiple parts and/or tooling 404 from a plurality of kitting stations 400 can be transferred simultaneously to the kitting area 406. In an embodiment, the operations of kitting the robotic assembly 300 may be performed autonomously, or semi-autonomously.

In an embodiment, the robotic assembly 300 can utilize the environmental capture device 320 during, or in response to, the kitting operation. For example, the robotic assembly 300 can track parts and/or tooling 404 as they are transferred from the kitting station 400 (or one or more intermediate equipment) to the kitting area 406. The robotic assembly 300 can map the parts and/or tooling 404 from the tracked data and locate the parts and/or tooling 404 in response to their mapped locations. The environmental capture device can further compare informations to determine whether the parts and/or tooling 404 have shifted, changed, been damaged, or otherwise altered at any time prior to, during, or after a servicing operation.

Transfer of parts and/or tooling 404 between the kitting stations 400 and the robotic assembly 300 can be performed by the robotic assembly 300, such as by the robotic arm 304. Alternatively, transfer of parts and/or tooling 404 can be performed by the kitting station 400 itself. Alternatively, transfer of parts and/or tooling 404 can be performed by one or more intermediate apparatuses or by one or more human operators.

In certain instances, the kitting operation may include a step of providing the robotic assembly 300 with one or more redundant tools or components. Without wishing to be bound by any particular theory, redundancy may be particularly useful in instances where there is high likelihood of servicing issues that might require additional parts in situ. In an embodiment, the robotic assembly 300 may be configured to remove unused redundant tools and/or components from the kitting area 406 after the service is complete. Removal of redundant parts and/or tooling 404 can be performed by returning the redundant parts to the original kitting station 400 or another kitting station 400, such as a drop-off kitting station. Removal of redundant parts can also include discarding the redundant parts. In an embodiment, certain redundant parts can be recycled for reuse whereas other redundant parts may be discarded if not used. One or more of the robotic assembly 300, kitting station 400, the one or more computing devices 328 and/or 330, or the like can be configured to determine the disposition of redundant parts after completion of the servicing operation.

Figure 5:
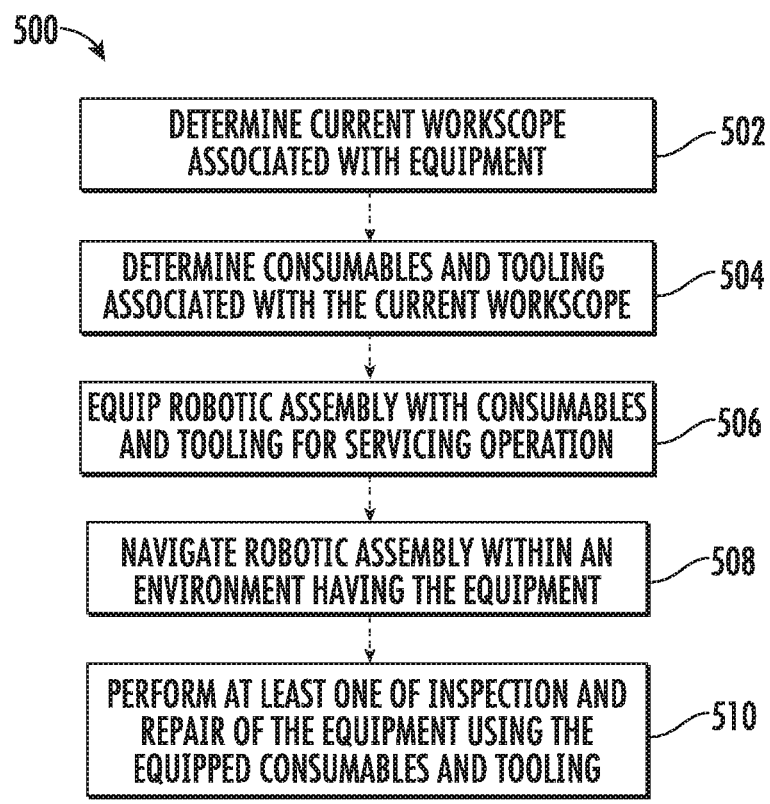
FIG. 5 is a flow chart of an exemplary method of kitting as part of a servicing operation of equipment in accordance with an exemplary embodiment of the present disclosure.

FIG. 5 is a flow chart of a method 500 of kitting a robotic assembly as part of a servicing operation of equipment in accordance with an exemplary embodiment of the present disclosure. As described above, the method 500 can include an initial step 502 of determining a current workscope associated with the equipment. The current workscope can include a preliminary workscope based on the anticipated servicing operation to be performed. The method 500 can further include a step 504 of determining parts and tooling associated with the current workscope. The method 500 can additionally include a step 506 of equipping a robotic assembly with parts and tooling for performing the servicing operation. The method 500 can also include a step 508 of navigating the robotic assembly within an environment having the equipment and a step 510 of performing at least one of inspection and repair of the equipment using the equipped parts and tooling.

Figure 6:
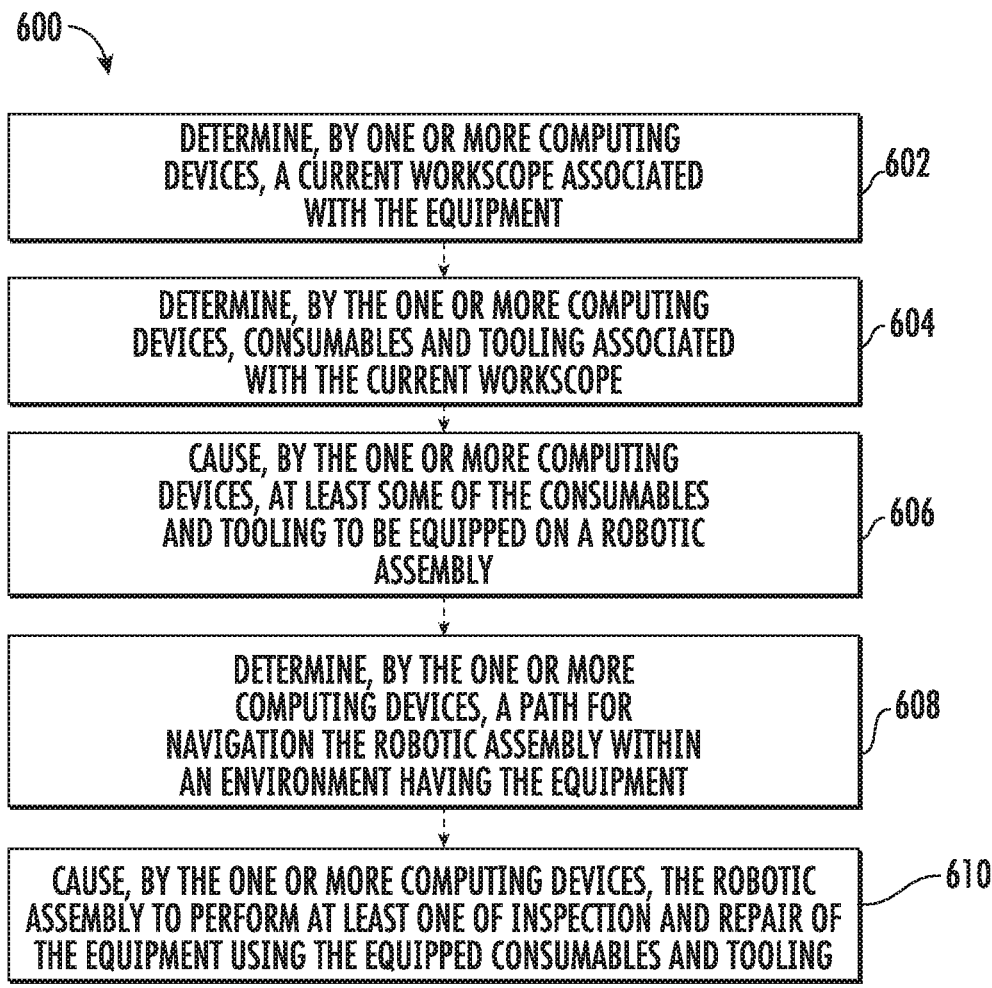
FIG. 6 is a flow chart of another exemplary method of kitting as part of a servicing operation of equipment in accordance with an exemplary embodiment of the present disclosure.

FIG. 6 is a flow chart of another method 600 of kitting including a step 602 of determining, by one or more computing devices, a current (e.g, preliminary) workscope associated with the equipment, a step 604 of determining, by the one or more computing devices, parts and tooling associated with the current workscope, a step 606 of causing, by the one or more computing devices, at least some of the parts and tooling to be equipped on a robotic assembly, a step 608 of determining, by the one or more computing devices, a path for navigating the robotic assembly within an environment having the equipment, and a step 610 of causing, by the one or more computing devices, the robotic assembly to perform at least one of inspection and repair of the equipment using the equipped parts and tooling.

Figure 7:
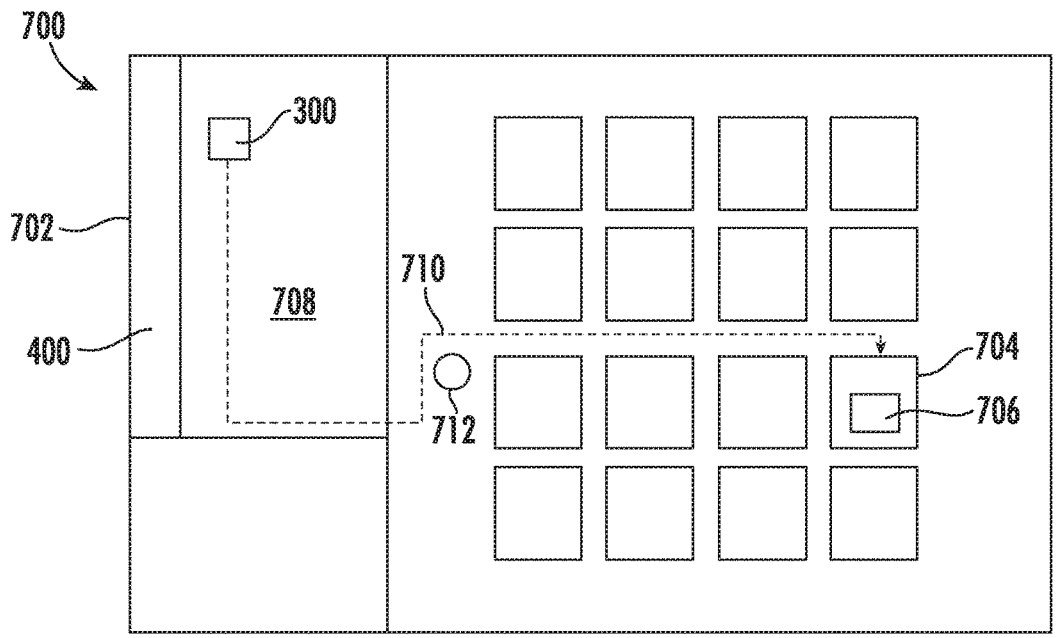
FIG. 7 is a schematic top view of an environment within which the robotic assembly can be configured to operate in accordance with an exemplary embodiment of the present disclosure.

FIG. 7 illustrates a schematic map of an exemplary environment 700 within which the robotic assembly 300 can be configured to operate. The environment 700 includes a building 702, such as an aircraft hangar or service location, with one or more service areas 704 in which the equipment 706 is serviced. The robotic assembly 300 is shown within a kitting room 708 including one or more kitting stations 400 configured to kit the robotic assembly 300 for a workscope associated with the equipment 706. While the kitting room 708 is shown as a contained volume within the building 702, in other embodiments the kitting room 708 can include an open space within the building 702 (e.g., sharing a common volume with one or more service areas 704). The kitting room 708 can also be disposed within another building (not illustrated) or an exterior environment relative to the building 702.

After receiving the kitted components from the kitting station 400, the robotic assembly 300 can navigate through the environment 700. Navigation can include, for example, determining a path 710 within the environment, e.g., from the kitting station 400 to the appropriate service area 704. The path 710 can be formulated so as to avoid obstacles 712 within the environment 700. These obstacles 712 might include building supports, walls, doors, other equipment and robotic assemblies, parts, human operators, animals, and the like. In an embodiment, the path 710 can be formed in view of other robotic assemblies 300 and the like also operating within the environment 700, e.g., accounting for the movement of other robotic assemblies 300. In an embodiment, the path 710 can be formulated by the one or more computing devices 328 and/or 330 and communicated to the robotic assembly 300.

The path 710 can be saved as a series of coordinates, lines, or otherwise recognizable data and used to navigate the robotic assembly 300 through the environment 700. Deviations within the path 710 may occur as a result of unknown obstacles 712, such as human operators moving through the building 702, fallen equipment or parts, and the like. In an embodiment, the environmental capture device 320 can be used during navigation to detect unknown obstacles 712 and assist in navigating through the environment 700. In another embodiment, a separate environmental capture device (not illustrated) may be used to detect unknown obstacles 712. Detection of an unknown obstacle can be communicated to the one or more computing devices 328 and/or 330 and the path 710 may be updated in view thereof. Updating the path 710 may be performed autonomously.

Once at the equipment 706, the robotic assembly 300 can begin a servicing operation on the equipment 706 in view of the associated workscope. In certain embodiments, the workscope may not have fully downloaded to the robotic assembly 300 prior to the kitting operation previously described. In such case, download may be completed during navigation from the kitting room 708 to the service area 704, once at the service area 704, or both. In other embodiments, the workscope may be received on an on-going basis during the servicing operation. In yet other embodiments, the workscope, or at least part of the workscope, may be determined by the robotic assembly 300 itself. For example, the computing device 328 may be part of the robotic assembly 300 and configured to autonomously, or partially autonomously, determine the workscope or a portion thereof. In a particular embodiment, the computing device 328 may determine portions of the workscope, such as proper alignment relative to the equipment, capturing and/or correlating the make and model of the equipment to determine the workscope, comparing the workscope to fleetwide data, and the like. In this regard, a large amount of the servicing operation—i.e., from forming the workscope to executing the workscope, can be performed locally by the robotic assembly 300. This disclosure is not intended to be limited to the above-described methods of information transfer and communication between two or more nodes and can include other methods of information transfer and communication between two or more nodes.

For certain workscopes, precision alignment might be required between the robotic assembly 300 and the equipment 706. Precision alignment may result in a higher degree of variable control between the position of the equipment 706 and robotic assembly 300. By way of example, precision alignment may occur when an alignment deviation relative to expected alignment between the equipment 706 and robotic assembly 300 is less than 10 mm, such as less than 8 mm, such as less than 6 mm, such as less than 4 mm, such as less than 2 mm, such as less than 1 mm, such as less than 0.5 mm. In a particular embodiment, precision alignment occurs when alignment deviation is less than 0.25 mm. In yet a further embodiment, precision alignment occurs when alignment deviation is less than 0.1 mm, such as less than 0.01 mm, such as less than 0.001 mm.

In an embodiment, the environmental capture device 320 can be utilized to establish precision alignment of the robotic assembly 300 with respect to the equipment 706. In another embodiment, the robotic assembly 300 can further include a precision alignment detector 338 (FIG. 3) configured to be used to establish precision datum or location information of the robotic assembly 300 relative to the equipment 706. Exemplary precision alignment detectors 338 might utilize stereo vision, three-dimensional triangulation techniques, or the like. Automatic collision avoidance may be used to ensure contextual collision risks, e.g., collision risk relative to the equipment 706, are understood and avoided.

In certain embodiments, one or more steps associated with the servicing operation may require use of additional, discrete servicing components, such as additional robotic assemblies or discrete sensors and detectors. The robotic assembly 300 can be configured to deploy one or more sensors or detectors along, near, and/or within the equipment 706 at any time relative to the servicing operation. The one or more sensors or detectors may be precisely, or imprecisely, placed relative to the equipment 706. The one or more sensors or detectors can be used prior to, during, and/or after the servicing operation to collect information relating to the equipment 706, the servicing operation, the robotic assembly 300, the like, or any combination thereof. In certain instances, the one or more sensors or detectors can be in communication, e.g., wireless or wired communication, with the robotic assembly 300 and/or the one or more computing devices 328 and/or 330 to communicate the sensed/detected information therewith.

Once appropriately positioned relative to the equipment 706 (e.g., either precisely aligned or otherwise ready to perform the servicing operation), the robotic assembly 300 may be configured to perform an initial inspection. Initial inspection can include comparing the equipment 706 against a last-known condition of the equipment 706, and optionally other additional information associated with the equipment 706. In certain instances, the environmental capture device 320 may be utilized to perform the initial inspection of the current condition. By way of example, the step of determining the current condition can be performed, for example, by one or more of visual inspections, thermal inspections, fatigue indicators, strength tests, coating checks (e.g., thickness, color, spallation, adhesion of contaminants, and the like), damage and degradation checks, shrinkage and expansion determinations, electronic verifications, hose checks, rotor checks, and the like.

Figure 8:
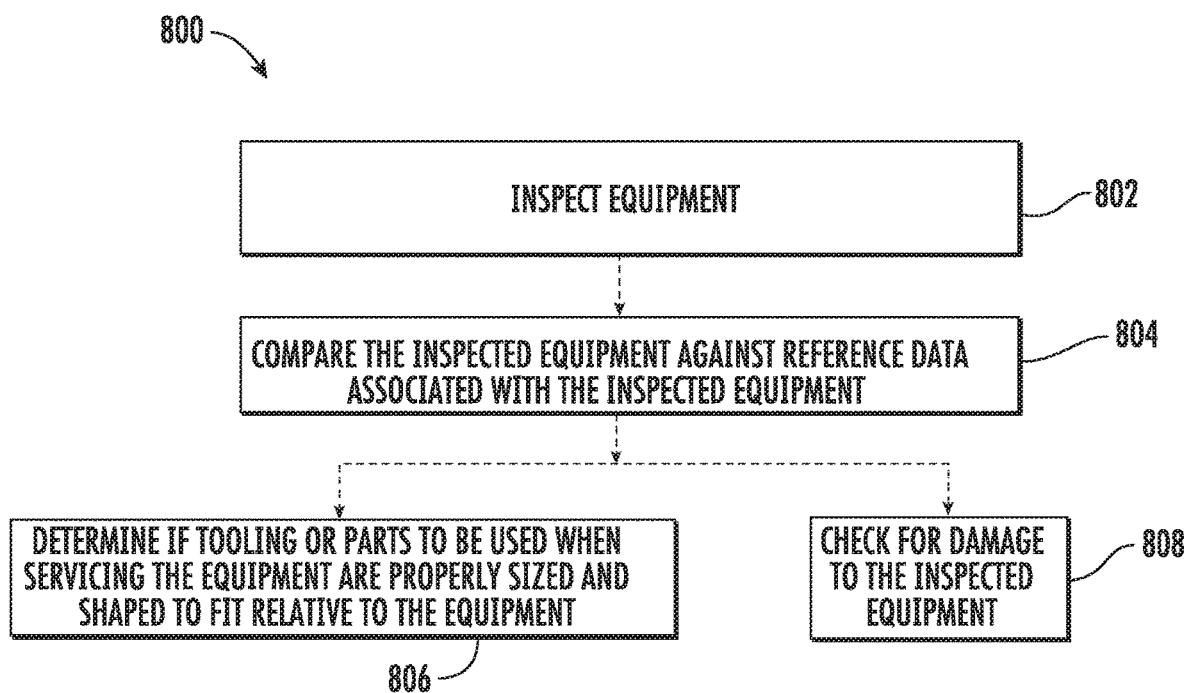
FIG. 8 is a flow chart showing an exemplary method of looking for unexpected changes to equipment in accordance with an exemplary embodiment of the present disclosure.

The current condition can be compared against the last-known condition, i.e., reference information such as reference data, upon which the preliminary workscope was at least partially based. Comparison can be made on a rolling (i.e., ongoing), staged, or completion-based protocol. In an embodiment, the current condition can be compared against computer aided design (CAD) reference data including a CAD engine design. The comparison of the last-known condition and the current condition can look for unexpected changes and analyze any unexpected changes in view of the preliminary workscope. By way of example, the CAD reference data may include tooling envelopes defining the necessary dimensions for tooling to properly fit within the equipment 706 to perform the service. Unexpected changes to the equipment 706 may cause tooling envelope failure, i.e., the prescribed tooling cannot fit within the equipment 706 to perform the workscope associated with the servicing operation. FIG. 8 is a flow chart showing a method 800 of looking for unexpected changes including a step 802 of inspecting the equipment and a step 804 of comparing the inspected equipment against reference data associated with the inspected equipment. In an embodiment, the step 802 of inspecting the equipment and the step 804 of comparing the inspected equipment can be performed simultaneously, or substantially simultaneously. Substantially simultaneous performance of inspection and comparing can occur, for example, where comparison of already-inspected aspects of the servicing operation occur while further inspection is ongoing. Alternatively, substantially simultaneous performance may occur where a time duration between inspection and comparison is negligible (e.g., less than ten minutes or less than one minute).

Information associated with the comparison performed at step 804 can be used at step 806 to determine if the tooling and/or parts 404 to be used when performing the service are properly sized and/or shaped to fit relative to the equipment (i.e., to prevent tooling envelope failure). The preliminary workscope can be updated in view of such unexpected changes, e.g., tooling envelope failure, and in certain embodiments a modified workscope may be created. In an embodiment, creation of the modified workscope may be performed by the one or more computing devices 328 and/or 330. In another embodiment, creation of the modified workscope may be performed by a human operator. In yet another embodiment, creation of the modified workscope may include use of autonomous logic and one or more human operators. The comparison performed at step 804 can further be used to check for damage to the inspected equipment at step 808.

Modified workscopes may be communicated between two or more nodes, e.g., between two or more robotic assemblies 300, the kitting station 400 and the robotic assembly 300, the one or more computing devices 328 and/or 330 and any other nodes, between two or more other nodes, or any combination thereof. In certain instances, the modified workscope may require the robotic assembly 300 to re-kit in order to perform the modified workscope. For example, where tooling envelope failure has occurred, re-kitting may require use of smaller tooling. In other instances, the modified workscope may generate an alert seeking human involvement (such as involving a specialist as described in greater detail below). In yet other instances, the modified workscope may be performed using some other combination of the kitted components already on the robotic assembly 300 (e.g., one or more redundant components on the robotic assembly 300).

Robotic assemblies 300 in accordance with embodiments described herein may be configured to operate autonomously, or semi-autonomously. That is, the robotic assemblies 300 may be configured to operate without, or under minimal, active human involvement. The robotic assembly 300 may be further configured to operate in or near high-temperature environments, such as near gas turbine engines cooling from operating temperatures. In such a manner, the robotic assembly 300 may be capable of servicing equipment, e.g., gas turbine engines, when human interaction is too dangerous. It may be advantageous to prioritize certain tasks within the workscope in view of such capability.

In an embodiment, the workscope may define a queue of tasks, including a plurality of ordered servicing steps. For instance, the workscope may indicate an initial servicing operation in view of initial environmental or equipment conditions and a successive servicing operation in view of successive environmental or equipment conditions. By way of example, gas turbine engines serviced on-wing immediately after use may have an initial, elevated temperature close to operating temperature which can decrease upon cooling. The elevated temperature of the gas turbine engine can refer to an environmental engine temperature average at least 300° F., such as at least 350° F., such as at least 400° F., such as at least 500° F., such as at least 750° F., such as at least 2000° F., or higher. In certain embodiments, the environmental engine temperature average may be less than 10000° F., such as less than 5000° F. In certain embodiments, the term "environmental engine temperature" may refer to a temperature of a surface component of the engine, a particular component of the engine being serviced, an area surrounding the surface component or the particular component of the engine being serviced, or the like. Accordingly, the environmental engine temperature may be an indicator of the temperatures that an operator or tool or robotic assembly will be exposed to if the operator or tool or robotic assembly services the particular component. Workscopes may consider such elevated temperatures and cooling gradients when determining the order of servicing operations.

Figure 9:
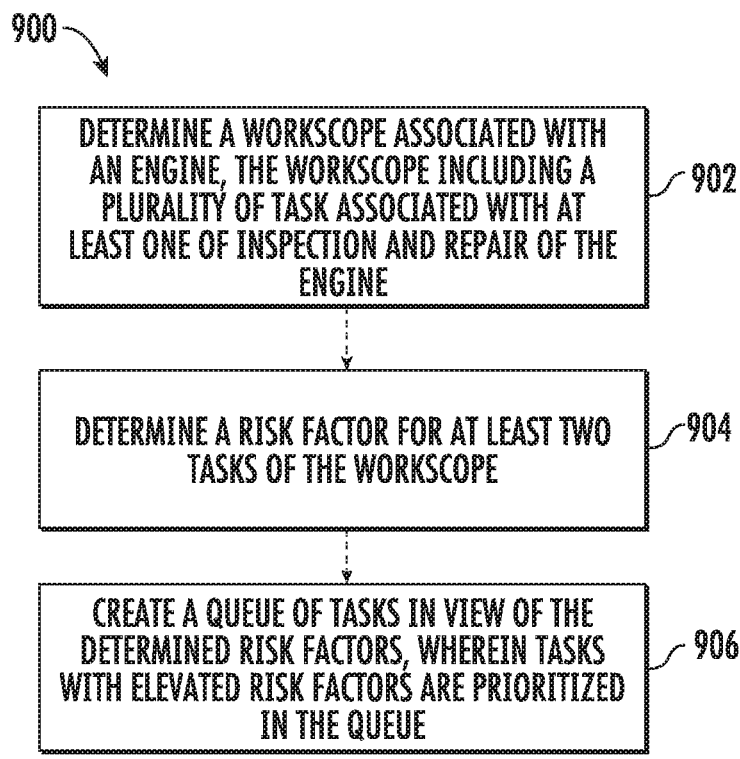
FIG. 9 is a flow chart of an exemplary method of creating a workscope for servicing an engine in accordance with an exemplary embodiment of the present disclosure.

Referring to FIG. 9, a method 900 of servicing an engine in accordance with an embodiment can include a step 902 of determining a workscope associated with an engine, the workscope including a plurality of tasks associated with at least one of inspection and repair of the engine. The method 900 further includes a step 904 of determining a risk factor for at least two tasks of the workscope. The method 900 additionally includes a step 906 of creating a queue of tasks in view of the determined risk factors in step 904 and prioritizing tasks determined to have elevated risk factors. In such a manner, in certain embodiments, at least two of the tasks of the workscope can be assessed for a risk factor associated therewith, and the resulting queue of tasks associated with the workscope can be formed in view of the risk factors. Tasks with higher risk factors can be prioritized in the queue. Risk factors might include, for example, likelihood of task failure, task criticality, the likelihood that performing the task may cause the workscope to escalate to a more serious or time-consuming operation, and the like. In an embodiment, the queue can be passive. Passive queues, for example, might contain a particular order of tasks to be completed without an option for adjusting the order or scope of the tasks. In another embodiment, the queue can be dynamic. Dynamic queues can be adjusted during the servicing operation, for example, in response to one or more unexpected changes associated with the service. In an embodiment, dynamic queues may be managed by the one or more computing devices 328 and/or 330 optionally using machine learning. Dynamic queues may provide servicing flexibility.

Figure 22:
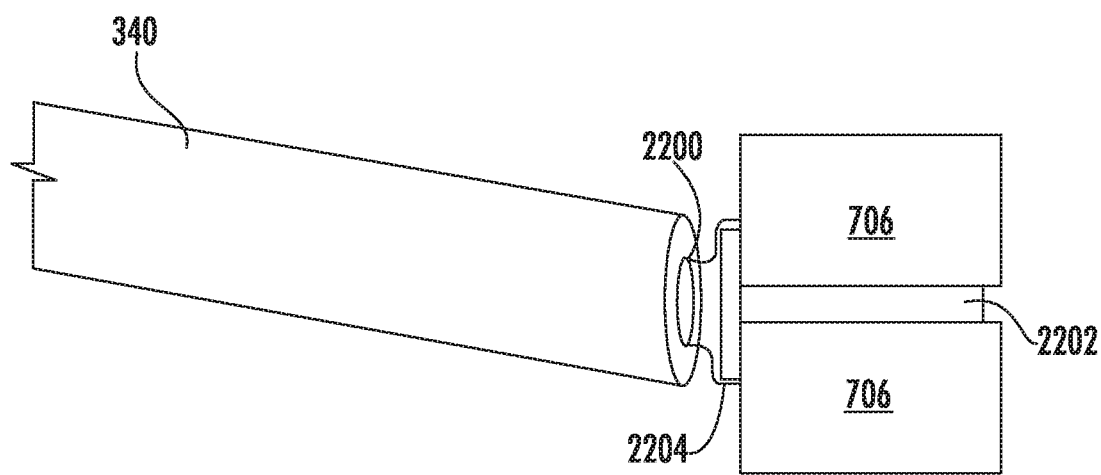
FIG. 22 is a schematic view of a dispenser head of a robotic assembly configured to dispense lubrication in accordance with an exemplary embodiment of the present disclosure.

Referring again to FIG. 3, in an embodiment the robotic assembly 300 can include a medium dispenser 340 (e.g., lubricant dispenser) configured to dispense one or more medium, e.g., lubricants, relative to, such as on at least a portion of, the equipment 706, such as on one or more adjustable components of the engine, a surface component surrounding the adjustable component, or an area surrounding the adjustable component or the surface component. Dispensing lubricant on the equipment 706 is one exemplary task which may be prioritized in the queue of the workscope as it may be an initial step required for a subsequent step, e.g., loosening of fasteners, to be performed. The lubricant can include, for example, a boundary lubricant, a mixed lubricant, and/or a full film lubricant including a hydrodynamic or elastohydrodynamic lubricant. The lubricant can include a liquid lubricant, a solid lubricant, a gaseous lubricant, or a semi-solid lubricant. By way of non-limiting example, the lubricant can include fatty alcohols, esters, EVA wax, PE wax, paraffin, soap, amides, fatty acids, the like, and combinations thereof. In an embodiment, at least a portion of the lubrication dispenser 340 can be disposed on the robotic arm 304. Referring to FIG. 22, the lubrication dispenser 340 can include a dispenser head 2200, such as a dispenser tip, and one or more lubricant reservoirs (not illustrated). One or more biasing elements, such as one or more pumps, pistons, or the like can bias lubricant from the one or more lubricant reservoirs to the dispenser head 2200. The robotic arm 304 can be configured to move the dispenser head 2200 of the lubrication dispenser 340 into position with respect to the equipment 706 to lubricate one or more components 2202, or pieces, thereof. The one or more components 2202 can include, for example, threaded- or non-threaded fasteners, borescope plugs, hinges, clips, and the like. In an embodiment, the workscope may cause dispensing of lubricant 2204 on the one or more components 2202 of the equipment 706 as an initial, or near initial, operational step of the workscope. Penetrating lubricants 2204 may then have an opportunity to penetrate the one or more components 2202 to allow easier operating thereupon at a later step of the workscope. Additionally, without wishing to be bound by any particular theory, it is believed that at least certain lubricants may perform better when applied to heated components and surfaces.

In some embodiments, the lubricant 2204 may be given a predetermined amount of time to penetrate. At the conclusion of the predetermined amount of time, the robotic assembly can then advance to a further task of the workscope associated with the component 2202 downstream of the lubrication step (e.g., removing the component). In other embodiments, the robotic assembly can attempt to operate on the component until such time as the component becomes operable. That is, for example, the robotic assembly can return to other tasks if the component is not yet operable and resume attempting to operate on the component at a later time after further penetration of lubrication occurs.

In certain embodiments, the robotic assembly 300 can further include a cooling component 342 configured to expose the equipment 706, or a portion thereof, to a relatively low temperature coolant. The cooling component 342 can be disposed on the robotic arm 304 or another portion of the robotic assembly 300. In an embodiment, the cooling component 342 can include a sprayer configured to dispense a cooling spray on the equipment 706. The cooling spray can include, for example, a liquid coolant (e.g., liquid nitrogen) and/or a solid coolant (e.g., carbon dioxide). The cooling spray can be directionally biased to contact a prescribed location of the equipment 706. As the equipment 706, or a portion thereof, cools in response to contacting the cooling spray, it may become easier to provide service thereto. In another embodiment, the cooling component 342 can include a closed-circuit coolant, such as a refrigerant circulated through at least a portion of the cooling component 342. A conduction interface can be formed between the closed-circuit coolant and equipment 706 to expose the desired portion of the equipment 706 to low temperatures. Closed-circuit coolant may allow the equipment 706 to cool without being wetted. By way of another example, the cooling component 342 can also include a Peltier effect thermo-electric cooler. By way of a further example, the component 342 may include a non-circulated phase change material such as a paraffin wax or other material with a relatively low temperature melting point compared to the equipment 706.

Localized cooling facilitated by the cooling component 342 may permit, for example, male threaded fasteners to cool at a relatively faster rate than female fasteners or threads in which the male threaded fasteners are disposed. Accordingly, relying on cooling and thermal gradients it may be possible to shrink the male threaded fasteners relative to the female threads and decrease the torque required to unthread the male threaded fasteners from the female threads. In such a manner, risk of stripping threads or damaging the equipment can be minimized without compromising on the amount of time necessary to perform the servicing operation.

Cooling operations can be performed based on cooling protocol established based on, for example, environmental conditions, component design, component material, and the like. In this regard, the unique characteristics of different equipment and components can be accounted for in determining the amount of cooling and location of cooling to be applied to that equipment and/or component. For example, short setscrews may be locally cooled without temperature gradient issues whereas long-shank bolts may require prescribed cooling and/or heating protocols, i.e., temperature control protocols, to affect removal of the long-shank bolt without risking damage the equipment and/or long-shank bolt. Similarly, optimal cooling protocols for screws may vary in view of particular material properties of the screws, like absolute temperature, required location of cooling, cooling duration, temperature curves, and the like.

Necessary temperature control protocol, e.g., cooling protocols, can be included in the workscope in view of reference values, fleetwide data, servicing history information, and the like. In an embodiment, the one or more computing devices 328 and/or 330 can determine the appropriate temperature control protocol for each component on the equipment. Such determination may be autonomous, or semi-autonomous (i.e., including, e.g., human confirmation).

In an embodiment, the cooling component 342 may be part of a temperature control component (not illustrated). The temperature control component 342 may be configured with a heating component configured to apply localized heat to the equipment. In a particular embodiment, the cooling component and heating component can be part of the same structure. By way of non-limiting example, a compressed air vortex tube can supply hot air to a first portion of the equipment and cold air to a second portion of the equipment. In certain instances, application of hot and cold air may be performed simultaneously.

The robotic assembly 300 can further include an operational tool, such as a wrenching device 344, configured to operate on one or more components, e.g., one or more threaded or non-threaded fasteners of the equipment 706. The wrenching device 344 may be disposed on the robotic arm 304 or another part of the robotic assembly 300. The wrenching device 344 may allow, for example, the unthreading of threaded fasteners while the threaded fasteners are at or above a threshold operating temperature above which human interfacing therewith is not possible. In this regard, the robotic assembly 300 can operate on the equipment 706 while the equipment is above a human operating threshold, e.g., in excess of 200° F., such as in excess of 500° F., such as in excess of 1000° F. In embodiments including cooling systems 342 and wrenching device 344, the cooling system 342 may be applied to the fastener first for a prescribed duration of time, after which the wrenching device 344 can be used to remove the fastener. For quick cooling systems 342, it may be possible to cool successive fasteners, i.e., the next fastener, with the cooling system 342 while the previous fastener is being removed by the wrenching device 344. In another embodiments, the robotic assembly 300 can include an operational tool, such as a wrenching device equipped with impulse loading means to cause shock waves to propagate through a threaded fastener, such impulse loading enabling friction between fastener male and female threads to be overcome without the use of excessive torque, or an impact torqueing device.

The robotic assembly 300 can include a receiving area (not illustrated) in which removed fasteners, or other removed components from the equipment 706, can be stored. In an embodiment, the receiving area can be configured to hold the removed fasteners and/or components at elevated temperatures without causing danger to the fastener or component, the equipment 706, the robotic assembly 300, nearby humans, or other sensitive equipment. In an exemplary workscope, the processes of cooling, removing, and storing fasteners and/or components can occur during one or more initial steps of the workscope, i.e., while the gas turbine engine is too hot for human operators to approach.

The environmental capture device 320 may be used to view the fasteners and other components of the equipment 706 as they are being removed from the equipment 706 or receiving area of the robotic assembly 300. The environmental capture device 320 can detect a condition of at least some, such as all, of the components being removed (and later reinstalled) to perform inbound (and outbound) verification of the components. Such verification may inspect for component damage and ensure that components being reinstalled match components that were previously removed. Such verification can further inspect that the components get returned in the same, or within a safe range, of the initial condition of the component. In an embodiment, the components being removed from the equipment 706 can be logged on a logged-component listing, for example, through visual capture by the environmental capture device 320 and autonomous analysis performed at least in part by the one or more computing devices 328 and/or 330. During reassembly, or reinstallation, of the components on the equipment 706, the logged component listing can be adjusted to remove each component as it is being reinstalled or upon completion of reinstallation. Upon final completion of reassembly of the equipment 706, the logged-component list should be empty as indication that all components were reinstalled relative to the equipment. When one or more components remain on the logged-component list after completion of reassembly of the equipment 706, diagnostic can be performed to determine where the remaining component(s) need to be installed and/or analyze servicing issues which caused the remaining component(s) to be omitted from reinstallation.

In an embodiment, the environmental capture device 320 can be used to inspect for proper equipment breakdown in preparation for servicing operations. That is, for example, the environmental capture device 320 can identify one or more plugs, ports, and other components which require removal from the equipment 706 to perform/complete service. For example, in an embodiment, the robotic assembly 300 includes an illumination device 346, such as a light pointer (e.g., a laser), a bulb, or the like to shine light into cracks, crevices, openings, and other spaces of the equipment. Reflecting or pass-through light detected by the environmental capture device 320 within an opening may be representative, for example, of a plug opening in which the plug was previously removed. To the contrary, where reflecting or pass-through light is expected but not detected, it may be possible that a plug or fastener was not yet removed or that debris or other materials remain within the opening. In response to detecting objects within the opening where no object was anticipated, the workscope may be adjusted so as to remove the detected object. In certain instances, such adjustment of workscope may be performed on the fly, i.e., at the time of detection. In other instances, such adjustment may be queued as a later task to be completed after one or more intermediary tasks are completed. This may be particularly suitable in instances, for example, where the robotic arm 304 is actively in the process of performing a task for which sudden termination is not appropriate.

In an embodiment, the environmental capture device 320 can be used to inspect for damage to the equipment 706 through observing a thermal response of the equipment over a duration of time, such as during a thermal transition duration which occurs when the equipment changes between an elevated temperature, e.g., an operating, or near-operating, temperature, and a lesser temperature. As objects undergo temperature changes, they generally exhibit reproducible thermal responses resulting in thermal gradients, which can be repeatedly observed with little, or no, variation. That is, for example, a gas turbine engine cooling from operating temperatures generally exhibits similar cooling patterns along the surface and on its components each and every time it cools. Damage to the gas turbine engine may be recognizable when the cooling patterns are different than expected. Reference hereinafter is made specifically to cooling transitions, however, in other embodiments, the same thermal response can be observed in warming transitions (i.e., transitions from a lower temperature to an elevated temperature). Moreover, transitions can occur naturally or through forced conditions (e.g., forced cooling and/or forced heating) which can occur in any number of possible combinations and permutations.

Figure 10:
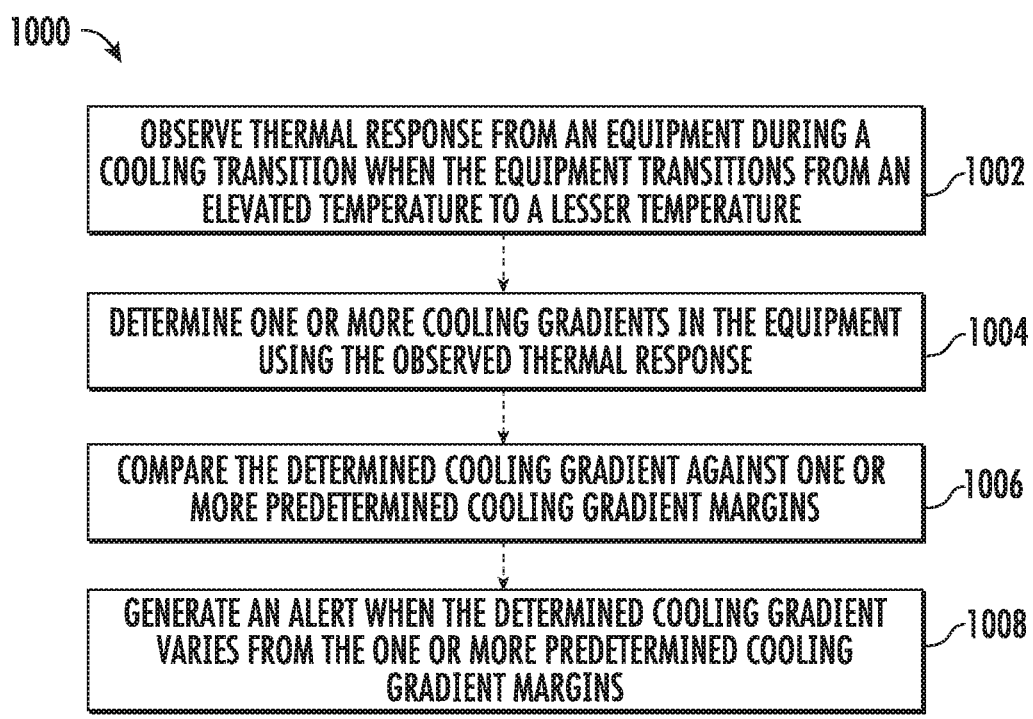
FIG. 10 is a flow chart of an exemplary method of inspecting for damage to equipment in accordance with an exemplary embodiment of the present disclosure.

FIG. 10 illustrates a method 1000 of detecting damage within equipment during an exemplary cooling transition including a step 1002 of observing a thermal response from the equipment during a cooling transition when the equipment transitions from an elevated temperature to a lesser temperature. In the case of engines, the elevated temperature and lesser temperature can be different by at least 10° C., such as at least 20° C., such as at least 50° C., or more. The exact cooling gradient required to observe damage may vary depending on the material of the equipment, the type of equipment, the location along the equipment, schematic arrangement of the equipment, and the like.

In an embodiment, cooling can occur naturally, e.g., as a result of ambient environmental conditions such as those encountered at the servicing area. The step 1002 of observing the thermal response can occur during and/or after cooling is completed. In another embodiment, cooling can include forced cooling where the component is cooled, locally or globally, and the step 1002 of observing the thermal response is performed in response to the forced cooling operation. The specific type of cooling, i.e., natural or forced, and the location of the cooling, e.g., local to which parts or global, may be information that is included as part of the workscope associated with the servicing operation. The step 1002 of observing the thermal response can be performed by the robotic assembly 300, autonomously or semi-autonomously, based, at least in part, on the workscope.

The method 1000 can further include a step 1004 of determining one or more cooling gradients in the equipment using the observed thermal response. This can include determining potential damage to the equipment based on the observed thermal response of the equipment. In an embodiment, the step 1004 can be performed at least in part by the one or more computing devices 328 and/or 330. Such determination may utilize finite element analysis, mapped thermal gradients, and the like.

At step 1006, the method 1000 can include comparing the determined cooling gradient against one or more predetermined cooling gradient margins. In an embodiment, the predetermined cooling gradient margin may be formed based on past servicing operations, computer simulated modeling, machine learning, fleetwide analysis (e.g., created at least in part by information from other similar equipment), and the like.

The method 1000 can further include a step 1008 of generating an alert (or action) when the determined cooling gradient varies from the one or more predetermined cooling gradient margins. This may be performed in response to the determined potential damage to the equipment. In an embodiment, the alert can be an alert detectable by a human operator. Exemplary alert protocols include audible, visual, and tactile alert notifications. In another embodiment, the alert can be detectable by the robotic assembly. For instance, the alert can be an informational message to the robotic assembly to take action in view of the potential damage. By way of example, the robotic assembly may be tasked with performing a reinspection of the area determined to have potential damage. In yet another embodiment, the alert can include multiple aspects, such as for example, a first alert for human operators and a second alert for the robotic assembly.

The determined cooling gradients can then be compared against one or more predetermined cooling gradient margins, i.e., expected cooling gradients, which may be stored, for example, in a data lake, such as the data lake described in greater detail hereinafter. The predetermined cooling gradient margins may be determined, for example, from historical information pertaining to past servicing events of the immediate equipment or fleetwide information, such as known and/or suspected defect(s) discovered in other equipment in the fleet. When the one or more determined cooling gradients is determined to deviate from the predetermined cooling gradient margin in excess of a threshold value, e.g., a predetermined percentage or absolute value, the alert can be generated. The alert can be indicative of an unexpected condition of the equipment which is observed through unexpected thermal gradients. Unexpected conditions encountered during thermal gradient analysis may be indicative of damage to the equipment 706. The alert may signal to one or more human operators, i.e., remote or local, of the issue or inform a future aspect of the workscope, e.g., causing the robotic assembly 300 to complete further tasks based around confirming, analyzing, etc. the alerted condition.

Figure 21:
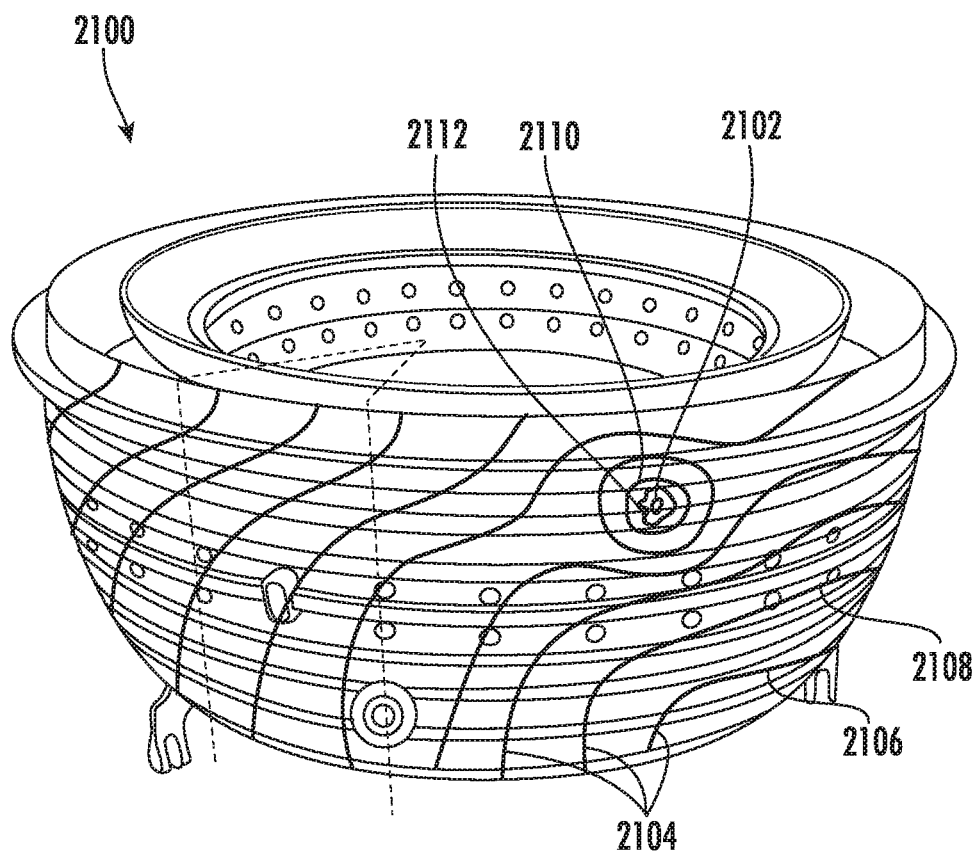
FIG. 21 is an isometric side view of a combustor section of a gas turbine engine as viewed in a captured image to illustrate a damaged area of the combustor section in accordance with an exemplary embodiment of the present disclosure.

FIG. 21 illustrates an isolated isometric side view of a combustor section 2100 of a gas turbine engine as viewed in a captured image (still or moving) from an environmental capture device such as the aforementioned environmental capture device 320. The combustor section 2100 generally includes a body in which at least one stage of combustion within the gas turbine engine may occur. As illustrated, the combustor section 2100 includes a damaged area 2102, e.g., a crack. The damaged area 2102 is shown enlarged along the surface of the combustor section 2100 for ease of viewing. It should be understood that the damaged area 2102 may not be visibly, or readily visibly, detectable as depicted in the figure. For example, the damaged area 2102 can include a stress point where accumulating stress has weakened the material of the combustor section 2100, one or more microscopic cracks have formed, and the like which are not readily discernable by unassisted human visual detection. Moreover, while the damaged area 2102 is shown as a single, discrete area along the combustor section 2100, it should be understood that the damaged area 2102 may span one or more areas spaced over a larger section of the combustor section 2100. Additionally, the damaged area 2102 may typically be located along liners of the combustors which form an inner part of the combustor section 2100.

As shown in FIG. 21, the image from the environmental capture device 320 can show a thermal gradient of the combustor section 2100. The thermal gradient can reference a relative or absolute temperature of the combustor section 2100 on a localized or aggregate basis. By way of non-limiting example, the thermal gradient can include a plurality of lines 2104 each indicative of a temperature. The same line can extend along the surface of the combustor section 2100 where the temperature is at a specific temperature. For example, line 2106 may indicate a first temperature, such as 1200 degrees Fahrenheit while line 2108 may indicate a second temperature, such as 1300 degrees Fahrenheit. Locations along the lines 2106 and 2108 correspond with the first and second temperatures, respectively. Locations between the lines 2106 and 2108 are at temperatures between the first and second temperatures. The precision of thermal analysis, i.e., the degree of observed thermal difference between adjacent lines 2104, can be as small as 0.001° F., such as 0.1° F. That is, adjacent lines 2104 can be narrowly spaced apart in relative temperature.

The damaged area 2102 of the combustor section 2100 is depicted as being surrounded by additional lines 2110 and 2112. By way of example, line 2110 can indicate a third temperature, such as 1100 degrees Fahrenheit and line 2112 can indicate a fourth temperature, such as 1000 degrees Fahrenheit. By comparing the lines 2104, or similar thermal gradient analysis (such as finite element analysis, color gradients, and the like), against the one or more predetermined cooling gradient margins expected for the combustor section 2100, it is possible to detect the damaged area 2102 as the damaged area 2102 may affect the cooling profile of the combustor section 2100 as the temperature thereof drops from an elevated, e.g., operational, temperature, differently than expected. Without wishing to be bound by any particular theory, it is believed that damaged areas 2102 may present themselves as localized temperature fluctuations, such as localized cool spots and/or localized hot spots along the surface of the equipment or component. Such localized temperature fluctuations might be caused by material thickness deviations, thus altering cooling characteristics of the components. Alternatively, one or more cracks or microcracks may permit air to penetrate deeper into the equipment or component at the damaged area 2102, allowing that area to cool faster than the remainder of the equipment or component. By comparing the observed thermal gradient relative to the expected thermal gradient, i.e., the predetermined cooling gradient margin, it may be possible to detect such damaged areas 2102. As previously described, in certain embodiments, cooling can occur through forced cooling and/or natural cooling. In certain embodiments, the cooling component 342 can perform the forced cooling operation. In other embodiments, the robotic assembly 300 may further include an additional cooling component configured to force cool the equipment or component.

After, or during, inspection of the equipment 706, the robotic assembly 300 can interact with the equipment 706 so as to prepare the equipment 706 for servicing, e.g., further inspection or repair. Such preparatory interactions can include, for example, the opening of latches and doors of the equipment 706 to reduce cooling times and/or provide access to the internal components of the gas turbine engine. In gas turbine engines, the workscope may initially task the robotic assembly 300 with opening latches holding thrust reverser doors closed while closing fan cowl doors. In an embodiment, the robotic assembly 300 can prop the latches and doors open and closed, respectively, if required as part of the workscope. With the doors and latches open, the environmental capture device 320 can observe one or more internal components of the gas turbine engine. Observation can include inspection of the current condition of the one or more internal components, such as thermal inspection, damage inspection, cooling behavior, and the like.

In certain instances, the robotic assembly 300 can perform preparatory steps on the equipment 706 while inspection is taking place. That is, for example, the environmental capture device 320 may be inspecting one component of the equipment 706 while another portion of the robotic assembly 300 opens the latches and doors of another component of the equipment 706. In other instances, preparatory steps can be completed prior to performing any part of the inspection.

Inspection processes can generally include inspecting the equipment 706 in view of the workscope. For example, certain workscopes, or tasks of workscopes, may be concerned with the thickness of protective coatings on the equipment 706. Inspection might include observation and testing of a current coating thickness at one or more areas along the equipment 706. This might be performed by a non-physical inspection, e.g., using a scanner, or through one or more physical inspections, e.g., using a push probe. In an embodiment, each task of the inspection can be performed individually, e.g., serially. That is, for example, the robotic assembly 300 may perform a second (latter) inspection task only upon completion of a first (prior) inspection task. In other embodiment, at least two of the tasks associated with the inspection process can be performed concurrently, e.g., in parallel. This may be particularly suitable for instances where a number of inspections on the equipment is high and/or time intensive.

Inspection can lead to inspection information describing inspected aspects of the equipment 706, such as tested coating thicknesses, surface damage, temperature gradients, and the like. Inspection information associated with the servicing operation may be transmitted to the one or more computing devices 328 and/or 330. The inspection information may be utilized to compare the current condition of the equipment 706 to the last-known condition(s) of the equipment 706 and other information. Where inspection turns up no unexpected inspection information, it may be suitable to proceed forward with the service, e.g., performing any necessary repairs. Where inspection turns up unexpected inspection information, it may be more appropriate to update the preliminary (previous) workscope accordingly. Update of the workscope may be performed by the one or more computing devices 328 and/or 330, by a human operator (such as by a specialist described in greater detail hereinafter), or both.

Figure 11:
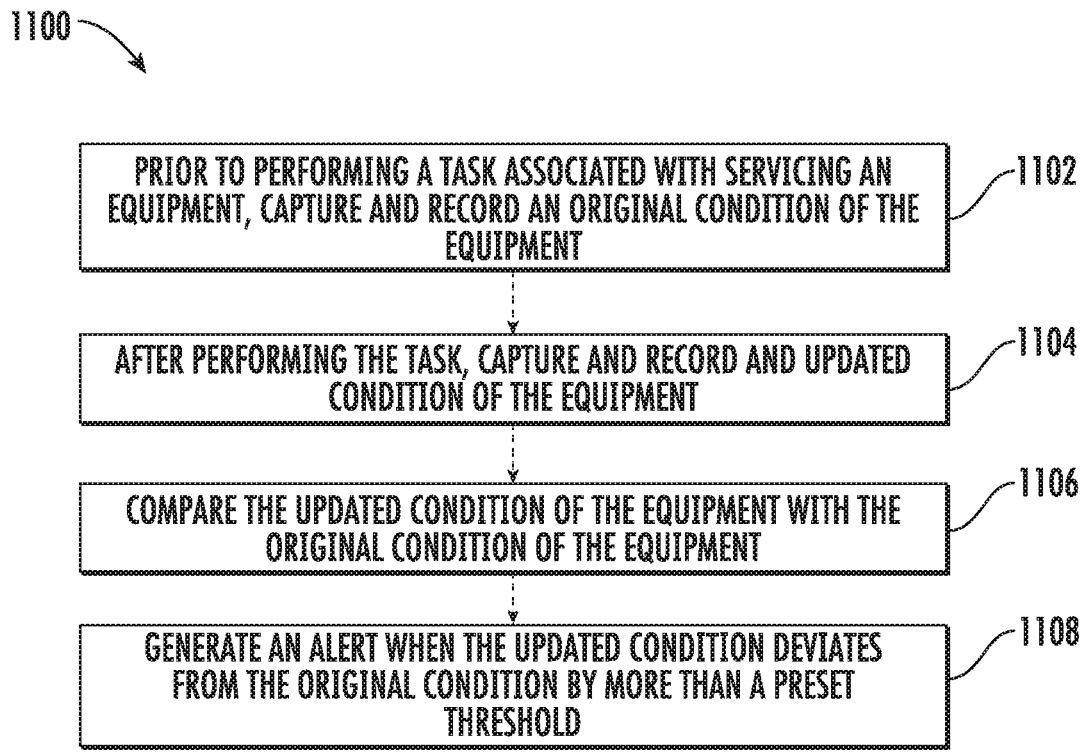
FIG. 11 is a flow chart of an exemplary method of generating alerts when an updated condition associated with a servicing operation deviates from an original condition, as determined prior to the servicing operation, by more than a preset threshold in accordance with an exemplary embodiment of the present disclosure.

In an embodiment, alerts can be generated when an updated condition of the equipment 706, as determined after an inspection operation, deviates from an original condition of the equipment 706, as determined prior to the servicing operation, by more than a preset threshold. FIG. 11 shows a flow chart of a method 1100 of generating alerts when an updated condition deviates from an original condition by more than a preset threshold. The method 1100 includes a step 1102 of capturing and recording an original condition of the equipment prior to performing a task associated with servicing the equipment. The method 1100 further includes a step 1104 of capturing and recording an updated condition of the equipment after performing the task. The method 1100 further includes a step 1106 of comparing the updated condition of the equipment with the original condition of the equipment. The method 1100 further includes generating an alert at step 1108 when the updated condition deviates from the original condition by more than a preset threshold. For example, a gas turbine engine may include a hinged door held closed by a number n of fasteners in an original condition, i.e., prior to service. After service, if the number of fasteners differs from n, the updated condition has deviated from the original condition by more than a preset threshold. Similarly, in an embodiment, alerts can be generated when inspection information is outside of acceptable conditions.

Inspection of the equipment 706 can be performed in a manner so as to assess whether conditions of certain components of the equipment 706 are within predetermined limits and ranges. For example, certain coatings may pass inspection when no portion of the coating is less than a threshold thickness. The inspection process can include a step of capturing information associated with the thickness of the coating and assessing whether the thickness of the coating is less than the threshold thickness. Where the thickness is less than the threshold thickness, an alert may be generated and/or the information associated with the thickness can be saved, e.g., uploaded to a node having a memory device, e.g., a data lake.

As used herein, the term data lake may refer to any one or more storage medium(s) configured to store large amounts of information. In an embodiment, all data, or substantially all data, captured by the robotic assembly 300 (or another assembly operating on the equipment 706) is stored on the data lake. Visual images and/or video of the inspection and/or repair process can be saved in the data lake for future analysis and review. Visual images and/or video of the inspection can further be analyzed in real-time for damage, defects, and other issues which may appear. Any detected damage, defects, or issues may be tagged with meta data or flagged within the data lake to facilitate easier future access and sorting. In addition, any data or information resulting from any one or more tests, analysis, models, and the like may be stored on the data lake.

Inspection and/or repair information can be saved to the data lake and utilized to prepare future workscopes, tasks within workscopes, kitting lists, and the like. For example, an nth servicing operation may result in servicing information like recorded information, which can be stored on one or more computing devices and/or the data lake. The recorded information can relate to any inspection data captured, such as, for example, material thicknesses, wear ratings, damage, and the like. The recorded information can include representative data, e.g., data determined through one or more measurement steps of the inspection, visual data, e.g., from the environmental capture device, audible data, including audio recordings created during the inspection, and the like. Similarly, an n+1 servicing operation may result in servicing information like recorded information, which can also be stored on one or more computing devices and/or the data lake. The information from the n+1 servicing operation can be synced with information from the nth servicing operation so as to provide a service history of the equipment. The servicing history can be used to autonomously inform aspects of future workscopes of the equipment 706. For example, where detected wear rates are repeatedly outside of an expected range, future workscopes may be adjusted to consider more frequent inspection, thicker repair coatings, and the like. Additional servicing operations such as n+2, n+3, etc. servicing operations can result in further servicing information like recorded information which can also be stored on one or more computing devices and/or the data lake to further update service history of the equipment and further inform aspects of future workscopes. In an embodiment, saved inspection and/or repair information can be used by the one or more computing devices 328 and/or 330 to train processing elements to perform or upgrade inspections and repairs autonomously. That is, for example, as described above, where a detected wear rate is repeatedly outside of an expected range, the one or more computing devices 328 and/or 330 may autonomously adjust future workscopes associated at least with the equipment being operated on such that subsequent inspections reveal the wear rate as being within the expected range.

Information from inspections can be analyzed after capture. Analysis can be performed by humans (remote and/or local) and/or one or more machine processors, e.g., the one or more computing devices 328 and/or 330. In certain instances, analysis can be performed while inspection is still taking place. That is, for example, already-inspected components can be analyzed while uninspected components are still being inspected or are in queue for inspection. In certain embodiments, at least some of the analysis of the captured information from the inspection can occur prior to repair operations. In such a manner, repair operations can be delayed a duration of time after the capture of information during inspection. In certain instances, it may be important to ensure that all of the inspection is clean, i.e., there are no major flagged conditions, etc., prior to initializing repair to prevent the likelihood of performing some of the repair only to discover that a further step in the repair cannot be completed due to a flagged condition.

In accordance with an embodiment, to reduce the likelihood of late-detected flagged conditions or other issues which might cause late workscope elevation (e.g., where inspection began on-wing but servicing later became elevated due to an encountered issue), inspection can be sequenced such that inspection aspects with the highest estimated, or most likely, chance of causing workscope escalation are inspected and/or analyzed first. For example, if a particular component is known to fail quicker than other components, the inspection and/or analysis of inspection information associated with that particular component may be performed prior to inspection and/or analysis of inspection information associated with the other components. In such a manner, the issues known to cause the highest probability of long equipment down-times can be inspected and/or analyzed first. This can reduce the likelihood of the investment of a large amount of time in thorough inspections and/or repairs which are rendered less valuable due to a later decision, for example, to remove the gas turbine engine from the aircraft wing (where inspection was performed on-wing) or open the gas turbine engine further than anticipated. In instances where the gas turbine engine can remain on-wing during inspection, the prioritized analysis of inspection information can reduce service time and provide maximum time to obtain tooling and components required in the servicing operation. By way of example, where a component is routinely outside of a threshold expected range, the inspection of that component may be performed earlier in the inspection process, such as during one of the initial tasks of the inspection process.

In an embodiment, additional inspection may be warranted, e.g., after an initial inspection reveals an unexpected issue. That is, while certain workscopes may define a task associated with an additional follow-up inspection, in other instances a follow-up inspection may not be part of the original workscope. In these instances, instructions associated with the follow-up inspection may be executed with a degree of autonomy at the task, or sub-task, level. For example, the follow-up inspection may be based on the initial inspection and autonomously updated in view of one or more issues encountered during the initial inspection. In such a manner, latency occurring as a result of additional workscope generation can be minimized and down time can be curtailed. However, such autonomous follow-up inspections may not be applicable in all instances. For example, there may be servicing operations which require human interfacing to determine the necessary aspects of the service warranting follow-up inspection. In such cases, remote operators may be able to provide local simulation environments to simulate the service, or a portion thereof, without latency. The local simulation environments may, for example, be generated through one or more CAD programs which can analyze the equipment within the environment, under normal loads and operating conditions, and the like. The remote operator may use the CAD program(s) to effectively mock up the environment to perform the tests which might otherwise require a local operator to perform. The remote operator may be able to generate a new autonomous task-based, or sub-task based, workscope at least partially based on machine intelligence observation of the simulation or machine learning based on a trial and error approach tested in the simulation of the environment and system. The remote operator can further verify the generated new autonomous task-based, or sub-task based, workscope based on presenting operators with simulated bounding error cases. If necessary, local operators, i.e., one or more operators located in the environment, can be scheduled to assist with a locally executed operation. In certain instances, the local and remote operators can work in concert to affect the workscope or one or more tasks associated therewith.

Figure 12:
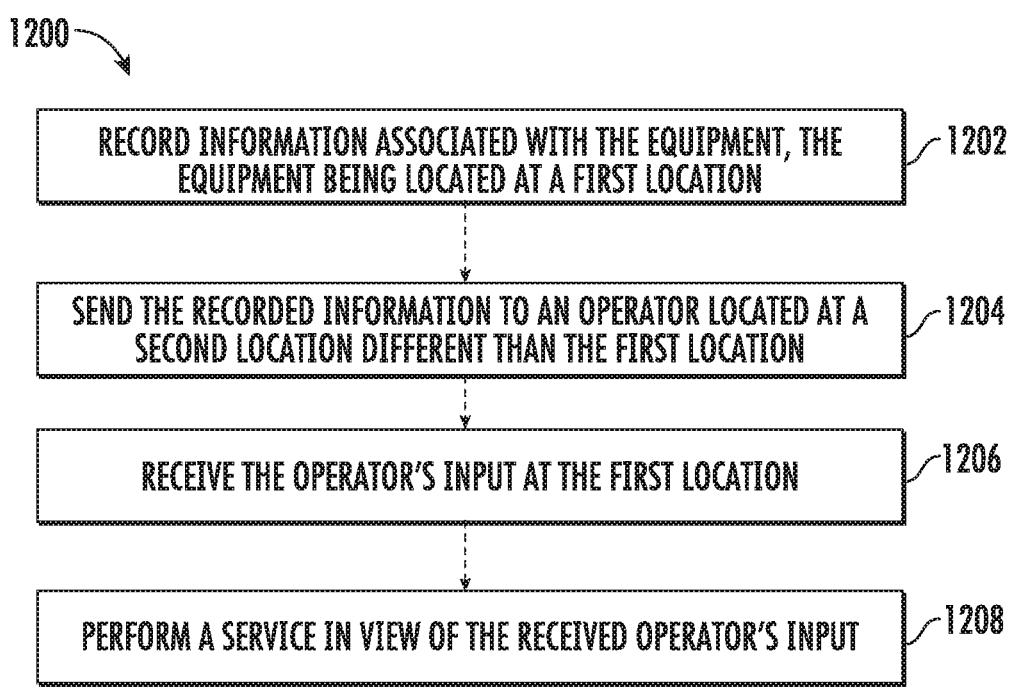
FIG. 12 is a flow chart of an exemplary method of performing a service with an operator in accordance with an exemplary embodiment of the present disclosure.

As previously described, inspection information can be stored in data lakes. Information, such as flagged conditions or components, may be forwarded to a human operator, such as one or more specialists in that particular component or engine section. FIG. 12 shows a method 1200 of utilizing human operators, such as remotely located specialists, to provide input. The method 1200 can include a step 1202 of recording information associated with the equipment at a first location. The method 1200 can further include a step 1204 of sending the recorded information to the operator, such as through a node. In response to the information, the specialist(s) can create a disposition of the information and alter the workscope if required. The specialist(s) may further request additional autonomous inspections, conduct remote inspections by controlling a machine (e.g., an onsite machine), or request an in-situ human inspection where appropriate. In certain instances, the specialist(s) may use a model, e.g. a computer simulation, to analyze the recorded information. Running the model to analyze the recorded information can include performance of a component analysis of a component of the equipment to determine data, e.g., indicative of a likelihood of failure of the component. One exemplary component analysis includes running a component analysis of a turbine blade with a crack to determine if the crack is going to cause the turbine blade to fail and after what duration failure might occur.

The method 1200 can further include a step 1206 of receiving the operator's input. The method 1200 further includes a step 1208 of performing the service in view of the received operator's input. In certain embodiments, a second opinion may be called upon where the specialist diagnosis differs or conflicts with a processor-generated diagnosis. This might allow for duplicative review where the results from the initial review are not in agreement.

One or more human operators can access information stored in the data lake through user interface(s) (not illustrated). In an embodiment, the one or more human operators can include a specialist having advanced knowledge of a component, or subcomponent, of the gas turbine engine. The specialist may access information stored in the data lake for purpose of inspecting at least a portion of the equipment, modifying the workscope associated with the equipment, providing approval to proceed with the workscope, troubleshooting an encountered issue, modifying the CAD description of the equipment, or the like. In an embodiment, the information to be reviewed by the specialist can be flagged for their attention. For instance, where a portion of the service requires specialist assistance, that portion of information stored in the data lake can be flagged for review by the specialist. The flagged information may include metadata or the like which can describe a criticality of the issue, the field of specialty needed for review, a review timeframe, and other relevant information which may allow targeted specialty review.

In certain instances, the specialist may be located at, or near, the environment in which the equipment is being serviced. In other instances, the specialist may be remote. For instance, the specialist may be located in a different country or region of the world from where the inspection is taking place. In such a manner, specialist review may occur while local, onsite operators are not present. In an embodiment, the specialist can review the information associated with the flagged issue while servicing is halted, e.g., during an overnight service.

Upon completion of (or in some embodiments, during) inspection (and any necessary re-inspections), servicing operations can include repairing the equipment 706 in view of the workscope, i.e., either the preliminary or one or more updated workscopes. The term "repair," can refer generally to any repair or maintenance activity on the equipment, including any activity that adds material to the equipment, removes material from the equipment, or changes a materials property of all or part of the equipment. In at least certain embodiments, the term "repair," as it relates to a component of the equipment, refers to performing tasks related to rejuvenating a damaged portion of the component and maintaining or protecting damaged and undamaged portions of the component. Repairs can include the changing of hoses, belts, nozzles, valves, blades, and the like, resurfacing operations, coating operations, cleaning operations, lubricating operations, timing adjustments, and the like. The step of repairing the equipment 706 can be at least partially performed in view of information captured by the aforementioned environmental capture device 320.

Figure 13:
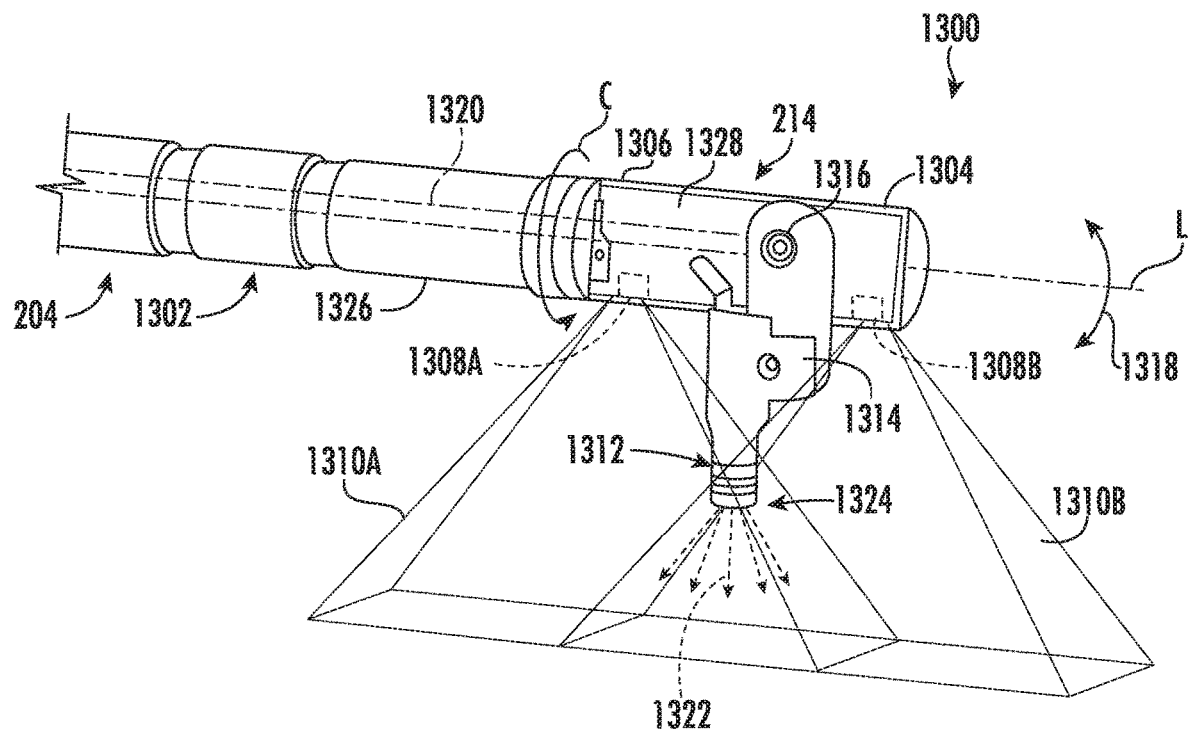
FIG. 13 is a close up, perspective view of an inspection and repair tool in accordance with an exemplary embodiment of the present disclosure.

Referring to FIG. 13, a close up, perspective view of the distal end 314 of the robotic arm 304 having an inspection and repair tool 1300 is shown in accordance with an exemplary embodiment of the present disclosure. The inspection and repair tool 1300 illustrated in FIG. 13 can be used for spray coating combustor components but can also be used, for example, to spray coat rotor blades, stator vanes, nozzles (such as a first stage turbine nozzle), shrouds, and the like. The inspection and repair tool 1300 generally includes an elongated insertion member 1302 and an implement body 1304 attached to the elongated insertion member 1302.

For the embodiment shown, the implement body 1304 includes implements for performing inspection and repair operations. Specifically, for the embodiment shown, the implement body 1304 includes a base 1306 extending along a longitudinal direction L and a vision system, which may be associated with the environmental capture device 320. More specifically, for the embodiment shown, the vision system is positioned at least partially within or coupled to the base 1306. More specifically, still, for the embodiment shown the vision system comprises a plurality of cameras 1308, and in particular comprises a first camera 1308A and a second camera 1308B. The first and second cameras 1308A, 1308B are spaced along the longitudinal direction L of the base 1306.

The first camera 1308A can define a first field of view 1310A and the second camera 1308B defines a second field of view 1310B. The first field of view 1310A overlaps with the second field of view 1310B. More specifically, for the embodiment shown, the first field of view 1310A overlaps with the second field of view 1310B at a location 1312 within about 12 inches from the base 1306 of the implement body 1304, such as at a location within about 8 inches, such as at a location within about 6 inches, such as at a location within about 3 inches, such as at a location within about 1 inch from the base 1306 of the implement body 1304.

In such a manner, the vision system may provide improved feedback for navigating the inspection and repair tool 1300 within the interior of the gas turbine engine and inspection of the interior of the gas turbine engine. For example, the overlapping fields of view 1310A, 1310B may provide for a desired depth perception when operating the inspection and repair tool 1300.

In addition, it will be appreciated that in certain exemplary embodiments, the implement body 1304 may additionally or alternatively include any other suitable means for determining a distance between the implement body 1304 and the components being inspected. For example, the implement body 1304 may include one or more laser depth sensors, or other suitable hardware (not shown).

Moreover, it will be appreciated that the one or more cameras 1308 of the vision system are operably coupled to the one or more computing devices 328 and/or 330 (see FIG. 2), such that the vision system may be used to inspect the interior (and exterior) of the gas turbine engine. For example, the vision system may be configured to communicate images of a thermal barrier coating, an environmental barrier coating, or the like within the interior to the one or more computing devices 328 and/or 330, along with location information indicative of where the thermal barrier coating is within the interior. The one or more computing device 328 and/or 330 may be configured to then compare the images to one or more baseline images to determine whether or not there is damage to the thermal barrier coating, environmental barrier coating, or the like. For example, a sample image of a thermal barrier coating, environmental barrier coating, or the like can include a damaged portion, known as a spallation, where the thermal barrier coating, environmental barrier coating, or the like has worn down. The one or more computing devices 328 and/or 330 may receive this image, compare it to one or more baseline images, and using, e.g., a pixel by pixel analysis, and determine there is damage in need of repair on the thermal barrier coating, environmental barrier coating, or the like. The analysis by the one or more computing devices 328 and/or 330 may determine the extent (e.g., depth, width, area, shape, etc.) of the damaged portion to facilitate a tailored repair of such damaged portion, as discussed below.

It will be appreciated, however, that in other exemplary embodiments, the one or more computing devices 328 and/or 330 may utilize any other suitable analysis technique to determine whether or not there is any damage to the thermal barrier coating, environmental barrier coating, or the like, the extent of such damage, etc. For example, in other exemplary embodiments, the one or more computing devices 328 and/or 330 may utilize a machine learning tool trained to identify the presence and/or extent of damage to the thermal barrier coating, environmental barrier coating, the like, or other component within an interior of an engine.

The implement body 1304 can further include a spray head 1314. The spray head 1314 is moveably coupled to the base 1306 of the implement body 1304 and is moveable between a retracted position and an extended position. Specifically, for the embodiment shown, the spray head 1314 is rotatably coupled to the base 1306 about a pinned connection 1316. For the embodiment shown, the spray head 1314 rotates at least about 30 degrees, such as at least about 45 degrees, such as at least about 90 degrees and less than 360 degrees between the retracted position and the extended position. Notably, for the embodiment shown, the spray head 1314 rotates within a plane parallel to the longitudinal direction L, along the reference arrow 1318. In such a manner, the spray head 1314 defines a first angle with the longitudinal direction L when in the extended position (e.g., about 90 degrees for the embodiment shown) and a second angle with the longitudinal direction L when in the retracted position that is different than the first angle (e.g., about 0 degrees for the embodiment shown).

In such a manner, the implement body 1304 defines a smaller cross-sectional profile when the spray head 1314 is in the retracted position to facilitate insertion of the implement body 1304 into the interior of the gas turbine engine (e.g., through an access port). Subsequently, once the implement body 1304 is within the interior, the spray head 1314 may be moved from the retracted position to the extended position to allow operation of the spray head 1314 as explained below. The spray head 1314 may be spring loaded.

Notably, for the embodiment shown, the spray head 1314 is fluidly connected to a fluid source through one or more fluid passageways 1320 extending along a length of the elongated insertion member 1302. The one or more fluid passageways 1320 may be a separate fluid conduit extended through the elongated insertion member 1302, or may be formed integrally within the elongated insertion member 1302. The one or more fluid passageways 1320 may provide the spray head 1314 with a flow of repair material 1322 to be sprayed on the damaged portion of the thermal barrier coating to repair the damaged portion of the thermal barrier coating. The repair material 1322 may be a slurry formed of a powder and carrier, which may be formed into a patch for the thermal barrier coating. For example, the powder may be a machine-curable ceramic powder mixture configured to bond to the damaged portion of the thermal barrier coating.

Although a single fluid passageway 1320 is shown schematically in FIG. 13, in other exemplary embodiments, the inspection and repair tool 1300 may include a plurality of passageways. For example, the inspection and repair tool 1300 may include a passageway for the repair material 1322, a passageway for cleaning and conditioning fluid, a passageway for curing fluid, etc. Each of these passageways may be fixedly or selectively in fluid communication with the spray head 1314.

Referring still to FIG. 13, it will further be appreciated that the spray head 1314 can define an outlet 1324 for spraying the repair material 1322 onto the damaged portion of the thermal barrier coating. For the embodiment shown, the outlet 1324 is within a field of view 1310 of the vision system. More specifically, for the embodiment shown, the outlet 1324 is within the first field of view 1310A and/or the second field of view 1310B of the first and second cameras 1308A and 1308B of the vision system. In such a manner, the one or more computing devices 328 and/or 330 may be capable of confirming a positioning of the spray head 1314 and a coverage of the repair material 1322 (or other material/fluid) sprayed.

Further, still, it will be appreciated that the exemplary implement body 1304 is capable of moving to assist with spraying operations. More specifically, for the embodiment shown, the implement body 1304 includes a stationary portion 1326 and a rotating portion 1328. The rotating portion 1328 includes the base 1306 and the spray head 1314, and is rotatably coupled to the stationary portion 1326, such that it may rotate in a circumferential direction C about the longitudinal direction L. The stationary portion 1326 includes one or more motors positioned therein for selectively moving the rotating portion 1328 about the circumferential direction C. Accordingly, it will be appreciated that in certain exemplary embodiments, the implement body 1304 may move the spray head 1314 along the circumferential direction C during spray operations to provide for a more even coverage of the repair material 1322 (or other material/fluid) sprayed.

It will be appreciated that the exemplary inspection and repair tool 1300 described hereinabove is provided by way of example only. In other exemplary embodiments, the inspection and repair tool 1300 may have any other suitable configuration. For example, in other exemplary embodiments, the spray head 1314 may be moveably coupled to the base 1306 in any other suitable manner (such as rotating and sliding, etc.), the spray head 1314 may have any other configuration of outlet(s) (such as a linear array or other pattern of outlets), the implement body 1304 may have any other suitable vision system or inspection system, the implement body 1304 may be configured to rotate in any other suitable manner, etc.

Figure 14:
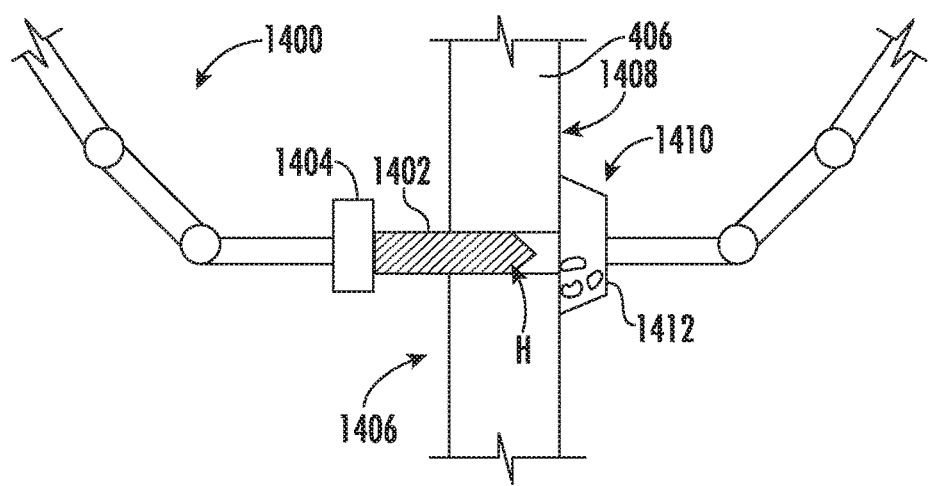
FIG. 14 is a close up, schematic view of an inspection and repair tool in accordance with an exemplary embodiment of the present disclosure.

FIG. 14 shows a close-up, schematic view of the distal end 314 of the robotic arm 304 having an inspection and repair tool 1400 different from the inspection and repair tool 1300 described with respect to FIG. 13. It will be appreciated that for the exemplary embodiment depicted, the operation being performed by the robotic system 300 on the equipment 706 is a physical operation (e.g., physically modifying the equipment). More particularly, for the embodiment depicted, the operation is a material removal operation, and more specifically still is a drilling operation. Notably, as used herein, the term "drilling operation" refers generally to any operation used to make a hole in or through the equipment, or a component thereof, whether the hole is circular in cross-section or defines some other shape. However, in other embodiments, the operation may be any other suitable physical operation (such as a material modification operation, or a material addition operation (such as a welding operation)), or other operation. For example, the operation may additionally, or alternatively, include one or more cutting operations, brazing operations, coating or slurry repair operations, etc. Specifically, for example, the operations may be a coating repair process (such as a thermal barrier coating repair process), whereby a first robotic arm is operable to remove at least a portion of an existing coating and a second robotic arm is operable to apply a new coating. Similarly, the operation may be a slurry repair operation for a ceramic matrix composite (CMC) component, such as a CMC liner, CMC shroud, etc. With such an operation, a first robotic arm may be operable to apply a slurry and a second robotic arm is operable to cure the slurry. Additionally, one or both of the first and second robotic arms (or additional robotic arms) may be operable to contour and/or level the slurry. In such a manner, it will be appreciated, that as used herein, the term "facilitate" may refer to performing a function simultaneously (e.g., first and second robotic arms working together simultaneously to perform the operation), or alternatively may refer to performing functions sequentially. By way of another exemplary embodiment, the operations may be cleaning operations (such as sandblasting, pressure washing, steam washing), and the like.

As is depicted in FIG. 14, for the exemplary embodiment depicted, the inspection and repair tool 1400 includes a mechanical drill having a drill bit 1402. A first utility member 1404 may be configured to rotate the drill (and drill bit 1402) to drill a hole H in or through the equipment 706, i.e., from a first side 1406 of the equipment 706 towards or to the second side 1408 of the equipment 706. The hole H may be, e.g. a cooling hole, or may be provided for any other purpose. Additionally, it will be appreciated that the hole H may be a new hole drilled by the mechanical drill of the first utility member 1404, or alternatively, may be an existing hole that is, e.g. clogged, needs to be widened, etc.

Also for the embodiment depicted, a second utility member 1410 includes at least one of a container or a suction member. More specifically, for the embodiment of FIG. 14, the second utility member 1410 includes a container 1412 for positioning over the hole H on the second side 1408 of the equipment 706 to capture or otherwise contain debris and/or other materials resulting from the operation of the mechanical drill of the first utility member 1404 to drill the hole H in the equipment 706. More particularly, for the embodiment of FIG. 14, the container 1412 is positioned completely around/over the hole H on the second side 1408 of the equipment 706, contacting the second side 1408 of the equipment 706. However, in other embodiments, the container 1412 may instead be positioned elsewhere to capture debris from the drilling operation. For example, in other embodiments, the container 1412 may be positioned underneath the mechanical drill of the first utility member 1404 on the first side 1406 of the equipment 706 to catch debris falling from the mechanical drill. Similarly, the container 1412 may be positioned underneath the opening on the second side 1408 of the equipment 706 of the hole H being drilled by the mechanical drill to catch the debris when the mechanical drill breaks through the second side 1408 of the equipment 706, or otherwise completes drilling operations of the hole H.

Figure 15:
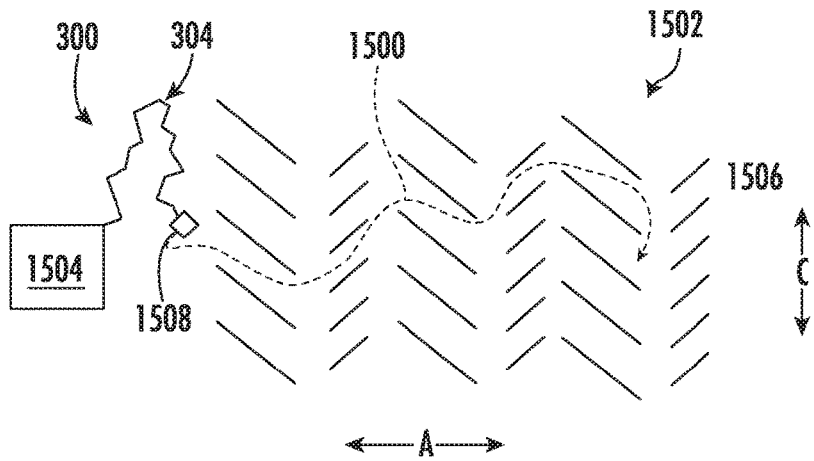
FIG. 15 is a schematic view of a path taken by a robotic arm during servicing operations in accordance with an exemplary embodiment of the present disclosure.

FIG. 15 shows an exemplary path 1500 through an environment 1502 for the robotic arm 304 to position a utility head of the robotic arm 304 at a desired task position and orientation is provided. The robot assembly 300 may be configured in substantially the same manner as exemplary robot assembly 300 described above, and further, the environment 1502 may be configured in substantially the same manner as one or more of the exemplary gas turbine engine environments described above.

More specifically, it will be appreciated that for the exemplary embodiment depicted in FIG. 15, a position of a base 1504, of the root end of the robotic arm 304, or both relative to the environment 1502 is known (relative to a coordinate system of the environment 1502, which for the embodiment shown is an axial direction A, radial direction R, and circumferential direction C coordinate system). The position of the base 1504 or root end may be manually input or alternatively may be determined by the one or more computing devices 328 and/or 330 using, e.g., one or more sensors of the robotic assembly 300. It will be appreciated, that in addition to the position of the base 1504 or root end, the one or more computing devices 328 and/or 330 may additionally know the orientation of the base 1504 or root end. Further, the base 1504 and/or root end of the robotic arm 304 may be mounted on another robot or joint(s) that allow for the modification of the position and/or orientation of the base 1504 and/or root end of the robotic arm 304. With such a configuration, the position and/or orientation of the base 1504 or root end may be communicated to the one or more computing devices 328 and/or 330.

Additionally, a task position and orientation 1506 for the utility member of the robotic arm 304 within the environment 1502 is known. The task position and orientation 1506 may be input into the one or more computing devices 328 and/or 330. For example, the one or more computing devices 328 and/or 330 may note a defect through an inspection of the environment 1502, and automatically determine a task position and orientation for the utility head 1508 of the robotic assembly 300. Further, a three-dimensional constraint of the environment 1502 is known. The three-dimensional constraint the environment 1502 may be determined by the one or more computing devices 328 and/or 330. For example, the one or more computing devices 328 and/or 330 may use a computer-aided design ("CAD") file, and/or may determine the three-dimensional constraint through inspection or scan of the environment 1502. Notably, for the embodiment depicted, the environment 1502 may be similar to, e.g., the LP compressor 22 described above with reference to FIG. 1. Accordingly, the three-dimensional constraint of the environment 1502 may be determined using, e.g., one or more CAD files for the LP compressor 22 (and turbofan engine 10), a three-dimensional mapping of the LP compressor 22, or any other suitable means. Of course, in other exemplary embodiments, the environment 1502 may be any other suitable environment, such as any other suitable section of the gas turbine engine, or other engine or system.

Further, still, a set of operability limitations of the robotic arm 304 is known (based on an input to the one or more computing devices 328 and/or 330, or, e.g., by sensing the operability of the robotic arm 304).

Based on the above factors, the robotic assembly 300, and more specifically, the one or more computing devices 328 and/or 330 of the robotic assembly 300, is configured to determine the path 1500 for the robotic arm 304 through the environment 1502 for positioning the utility implement 1508 of the robotic arm 304 in the determined task position and orientation 1506 within the environment 1502. For example, the path 1500 may be determined by starting with the known task position and orientation 1506, and subsequently constraining the path 1500 based on the three-dimensional constraints of the environment 1502, the set of operability limitations of the robotic arm 304, and the position of the base 1504, the root end 312, or both relative to the environment 1502.

The path 1500 determined for the robotic arm 304 may include a plurality of sequential coordinates (e.g., X1, Y1, Z1; X2, Y2, Z2; X3, Y3, Z3; etc., or rather A1, R1, C1; A2, R2, C2; A3, R3, C3; etc.) for the robotic arm to follow within the three-dimensional environment 1502. Additionally, it should be appreciated that the path 1500 may also include orientation information for the robotic arm 304 at these positions (and/or between these positions) within the three-dimensional environment 1502. The orientation information may include angular information for the links of the robotic arm 304 at each of the coordinates relative to each axis of the coordinate system of the environment 1502 (e.g., relative to the axial direction A, radial direction R, and circumferential direction C), such that the path 1500 includes information for up to six degrees of movement along some or all of the path 1500. For example, if a tool or utility member 1508 at the distal end of the robotic arm 304 has a greater extent in one dimension than another (e.g., taller than it is wide), it may further be necessary to ensure the robotic arm 304 moves through the three dimensional environment 1502 with the appropriate orientation, in addition to the appropriate position. Accordingly, it will be appreciated that in at least certain exemplary aspects of the present disclosure, determining the path 1500 may include determining the path 1500 further in view of certain dimensions of the utility member 1508 and/or an orientation of the base 1504, root end 312, or both (in addition to its position).

In certain servicing operations, it may be desirable to mark an index location from which future measurements can be derived. For example, it may be desirable to mark an index turbine, e.g., an initial turbine, either generally or at a specific location during inspection against which measuring relative position or counting in relation to the indexed mark can be performed. This may reduce errors associated with, e.g., incorrect rotor blade count and the like, while permitting a reference point for comparison against.

During servicing operations, it may be further useful to identify a current step in the workscope or a current location along the equipment 706 where service is currently being performed. For example, when servicing gas turbine engines it may be appropriate to inspect the airfoils. As gas turbine engines typically include a plurality of stages each having a plurality of airfoils, it may be useful to identify the current stage of airfoils being serviced, or the exact airfoil being serviced, or even the exact location along the airfoil being serviced. In such a manner, it may be easier to identify issues associated with individual components of the gas turbine engine. Moreover, being able to identify a current location of operation may enable interruptions of the servicing operation without risk of omitting steps from the servicing operation. That is, with the current step or component being tracked, it is possible to stop servicing operations for a duration of time (e.g., one second, one day, one month, or the like) and resume at a later time without losing track of current tasks and with certain knowledge of the last component operated on at the time of the interruption. Repair operations can thus be performed as if they had occurred uninterrupted.

Figure 16:
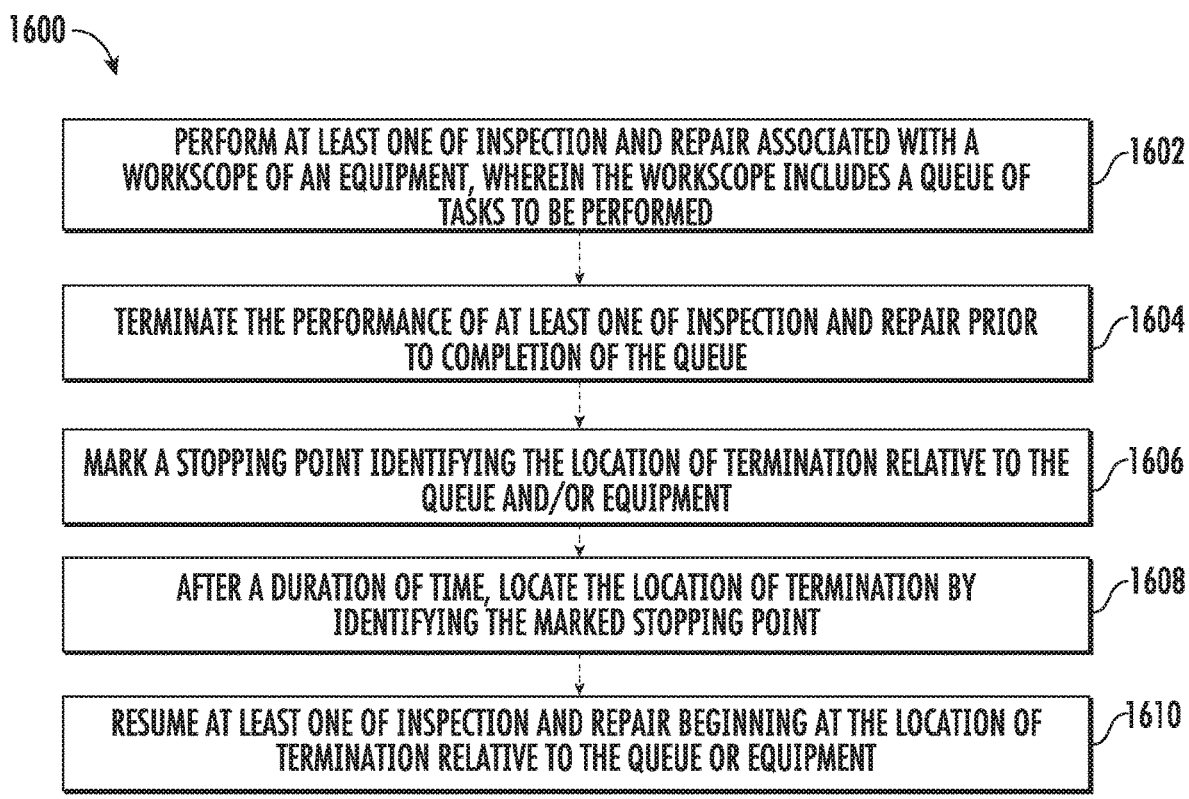
FIG. 16 is a flow chart of an exemplary method of marking a stopping point identifying a current location of operation in accordance with an exemplary embodiment of the present disclosure.

Identification of the current step in the workscope or a current location of service may include marking the location of a current operation on the equipment. For instance, marking the current airfoil of a gas turbine engine being inspected. Referring to FIG. 16, a method 1600 of servicing equipment can include an initial step 1602 of performing at least one of inspection and repair associated with a workscope of an equipment, wherein the workscope includes a queue of tasks to be performed. At some point, the method 1600 can include a step 1604 of terminating the performance of the initial step 1602 prior to completion of the queue. That is, for example, the servicing operation can be paused. In such instances, the method 1600 can include a step 1606 of marking a stopping point identifying the location of termination relative to the queue and/or equipment 706. Marking the location of current operations can include, for example, applying a heat-resistant marking technology that can survive elevated temperatures in excess of at least 300° F., such as at least 350° F., such as at least 400° F., such as at least 500° F., such as at least 750° F., such as at least 2000° F., or higher. The marking technology can also include a chemical marking, a non-heat resistant physical marking, and the like. In certain embodiments, the marking technology can be configured to leave a permanent mark on the equipment. In other embodiments, the marking technology can be configured to leave a temporary mark on the equipment. For example, the mark may fade or otherwise disappear over time or upon washing or treatment with a particular mark-removing material. The step 1606 of marking the current step or location along the equipment 706 may be performed using a similar, same, or different marking technique, type, or other identifying factor as compared to marking for the index location described above In an embodiment, marking can be performed with respect to micro-features of the equipment 706. For example, it is typical for gas turbine engines to include microscopic surface textures or defects formed as a result of manufacturing, use, service, or other occurrence. The existence of such microscopic surface textures or defects can allow for the marking of a current location of service relative thereto. For example, in one embodiment, marking the current location of operation can include a step of identifying one or more micro-features of the gas turbine engine at or adjacent to the current location and a step of relating the current location of operation to the one or more micro-features. By way of example, the micro-features can correspond with surface textures, surface indicia, surface defects (e.g., nicks, scrapes, etc.), surface features, surface colors, surface temperatures, the like, or any combination thereof. These micro-features can be identified, e.g., mapped, relative to the current location for purpose of recording the current location of operation.

In embodiments where marking is performed with a non-physical markings, such as the identification and mapping of micro-features of the equipment 706, it may be appropriate to store the marked location, i.e., the mapped location of the marked location relative to the micro-features, in a memory device associated with the one or more computing devices 328 and/or 330, the data lake, or another computing device. The mapped location can include, for example, a coordinate system relative to the micro-feature. Where multiple micro-features are used in combination, the coordinate system can triangulate the mapped location from information associated with the micro-features. Accessing the stored data associated with the marked location can permit the robotic assembly 300 (or another component, assembly 200, or person) to readily orient to the current location, e.g., a precise three-dimensional coordinate corresponding with the current location, within the workscope and quickly resume servicing operations.

The method 1600 can further include a step 1608 including, after a duration of time, locating the location of termination by identifying the marked stopping point performed at step 1606. In response to locating the location of termination at step 1608, the method 1600 can further include a step 1610 of resuming at least one of inspection and repair beginning at the location of termination relative to the queue or equipment. For instance, where an operation previously being performed related to inspection of a surface of an airfoil, resuming inspection at step 1610 after a duration of time may include bypassing areas of the airfoil already inspected and immediately resuming inspection at the location of termination of the prior inspection process. In such a manner, the inspection can be performed quicker without repetitive, time-wasting operations.

Figure 17:
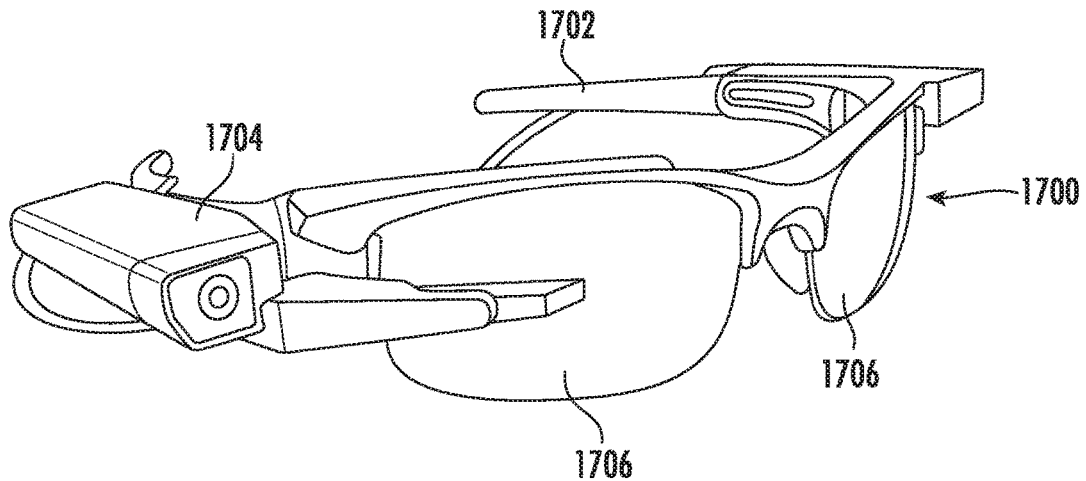
FIG. 17 is a perspective view of an augmented reality device to be used in performing a servicing operation on equipment in accordance with an exemplary embodiment of the present disclosure.

In certain instances, one or more repair operations can be performed with the assistance of local human operator(s). In an embodiment, at least one of the local human operators may wear an augmented reality device 1700 like the one shown in FIG. 17 when performing the repair operation. By way of example, the augmented reality device 1700 may include a pair of augmented reality glasses 1702 including a camera 1704 and one or more displays 1706 configured to generate a current field of view display. By way of example, the camera 1704 can include a 3D camera capable of capturing a three-dimensional image, a standard two-dimensional camera, a video camera, an infrared imager, and the like. The camera 1704 can also include other types of sensors, such as inertial navigation systems (INS) to provide precise positional feedback to the one or more computing devices 328 and/or 330. The INS, in particular may be a less intensive use of resources as compared to visual detection and processing protocol. The augmented reality device 1700 can further include other types of augmented reality devices, such as personal computing devices, including smartphones, laptops, and tablets. The augmented reality device 1700 may be used to obtain a real time image from the camera 1704 as seen by the local human operator and display augmented images to the operator using the displays 1706.

The augmented reality device 1700 may include a computing device including, for example, a processor and memory configured to store software that can be executable by the processor. The computing device may be configured to store, access, and execute the display of instructional images to the operator on the display 1706.

A current field of view display 1706 on the augmented reality device 1700 may be utilized during the repair operation to display rendering(s) of components, instructions regarding operations to be performed, directional arrows or contextual information associated with the components or equipment, or the like. The augmented reality device 1700 may also be configured to generate audible instructions. In certain instances, the augmented reality device 1700 can be in communication with the robotic assembly 300. In other instances, the augmented reality device 1700 can be in communication with the one or more computing devices 328 and/or 330. In yet other instances, the augmented reality device 1700 can be in communication with the data lake. In further instances, the augmented reality device 1700 can be in communication with any combination of the robotic assembly 300, the one or more computing devices 328 and/or 330, and the data lake. Using the augmented reality device 1700, the local human operator can initiate servicing operations on the equipment. Moreover, in certain embodiments, the augmented reality device 1700 can promote worksite safety, such as by displaying to the operator certain warnings associated with dangerous environments (e.g., hot surfaces, hot fluids, slippery floors, electrical charge present, and the like). These warnings can be generated, for example, by the one or more computing devices 328 and/or 330 in view of changing environmental conditions, predetermined dangerous conditions, or a combination thereof. The augmented reality device 1700 may also provide or be combined with a conventional safety function by providing physical protection to the human operator's eyes.

Figure 18:
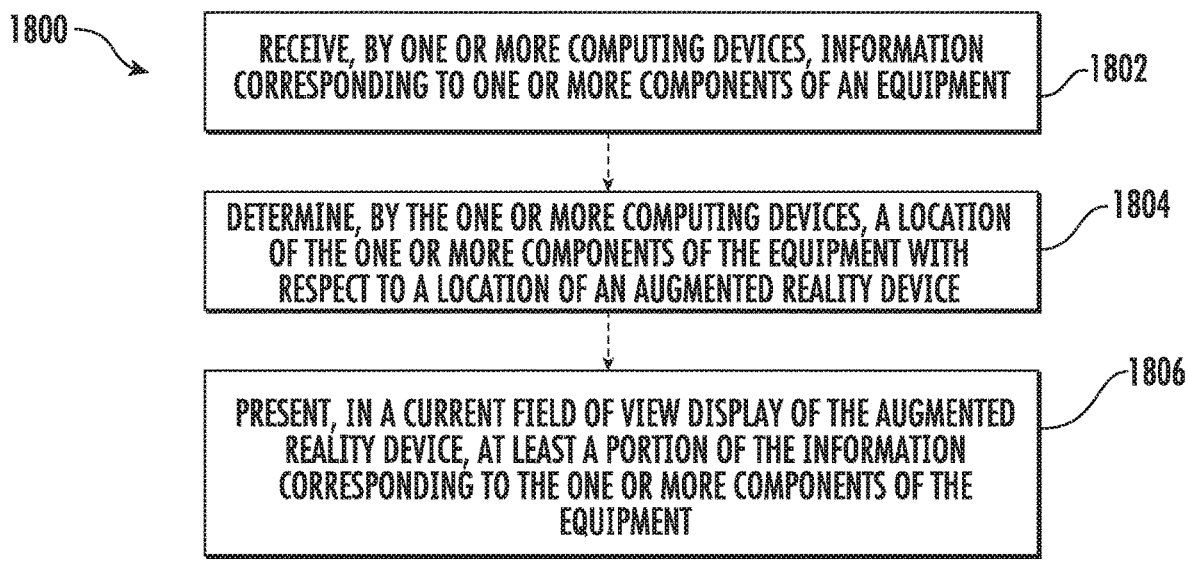
FIG. 18 is a flow chart of an exemplary method of using an augmented reality device as part of servicing equipment in accordance with an exemplary embodiment of the present disclosure.

FIG. 18 is a flow chart of a method 1800 of using an augmented reality device to service equipment, such as an engine. The method 1800 includes a step 1802 of receiving information corresponding to one or more components of an engine. The information can be received by one or more computing devices 328 and/or 330. The method 1800 can further include a step 1804 of determining, by the one or more computing devices, a location of the one or more components of the equipment with respect to a location of an augmented reality device. The method 1800 can further include a step 1806 of presenting, in a current field of view display of the augmented reality device, at least a portion of the information corresponding to the one or more components of the equipment. The portion of information can include at least one of a rendering of the one or more components, instructions regarding operations to be performed on the one or more components, directional arrows or contextual information associated with the one or more components, or any combination thereof. The operator can utilize the portion of information presented in the current field of view as part of servicing operations. For example, where inspection of a specific component of equipment requires human interaction, the augmented reality device can be configured to guide the operator to that location and/or present any relevant or necessary information such as localized temperatures of the equipment or component, tooling required for the inspection, access paths to the component, and the like. In certain instances, the augmented reality device can be configured to automatically detect the actions taken by the operator. In other instances, the operator can manually notify the augmented reality device of completion or occurrence of one or more actions taken. For example, the operator might audibly describe the operation being completed or tactilely enter information associated with the operation.

In an embodiment, the robotic assembly 300 may be configured to provide information to the human operator through one or more user interfaces. In an embodiment, the user interfaces can include screens. In another embodiment, the user interface can include a projected image. In certain instances, the projected image can be projected onto a surface of the repair location, e.g., on the floor near the equipment. In other instances, the projected image can be projected onto the equipment. The projected image can be projected, for example, onto a flat surface of the equipment, a smooth surface of the equipment, or at a location along the equipment where a human servicing operation is to be performed. The projected image can include instructions, indicia, or other information which may assist the human operator in performing the servicing operation. The projected image may be static, dynamic, or both. The projected image can move relative to the equipment, such as to point out a next task, or a component associated therewith. In an embodiment, the projected image may be seen without the assistance of the aforementioned augmented reality device 1700. In another embodiment, the projected image may require the use of equipment, such as the augmented reality device 1700, glasses, or the like. In certain instances, the human operator can utilize both the augmented reality device 1700 and the projected image to complete a human servicing operation. In other instances, the human operator can use either the augmented reality device 1700 alone or rely on the projected image alone.

Upon completing the repair operation, the equipment 706 can be re-inspected by the robotic assembly 300. In an embodiment, the re-inspection process can be similar to the aforementioned initial and/or additional inspection processes. For instance, the re-inspection process can be performed using an autonomous robotic assembly 300 to verify a successful and complete service process execution. Re-inspection can verify the condition of the equipment 706, that parts and/or tooling 404 were properly used and/or returned to the robotic assembly 300, that servicing objectives were satisfied, and the like.

Data gathered in the re-inspection can be uploaded to the aforementioned data lake for analysis. The resulting analysis can be used to predict component longevity based on the current conditions of the equipment immediately after service and re-anchor engine-specific condition data in order to predict future engine life and inspection and maintenance requirements.

For example, a pre-service (initial) condition profile, CP1, of the engine, which can be used to formulate the preliminary workscope during an initial servicing operation, may be updated or supplemented with an updated condition profile, CP2, having re-anchored conditions and analysis of the engine determined as a result of the initial service. Successive servicing operations can be based, at least in part, on CP2, and further optionally CP1. Further servicing operations can be performed similarly, including the steps of utilizing a previous condition profile of the engine and updating or supplementing the condition profile in view of the service performed at that time. For example, a further updated condition profile, CP3, can be formed in response to a further servicing operation, and so on. The condition profiles, e.g., CP1, CP2, CP3, CP4, etc., can be saved locally, e.g., at the robotic assembly 300, by the one or more computing devices 328 and/or 330, in the data lake, or the like. In this regard, the data from the re-inspection may re-anchor the engine conditions so as to inform future workscopes associated with the equipment. Moreover, in an embodiment the data may be used to set an interval of time until a future action is required for a particular task performed during the servicing operation. For example, when the servicing operation reveals a cracked surface on the equipment, the data associated with the crack can be used to predict the expected remaining operational lifecycle of the cracked portion of the equipment and inform, for example, the date of a future workscope to repair or replace the cracked part in view of the expected remaining operational lifecycle. While certain cracks may be predicted to require replacement after 25 additional cycles of operation, other cracks having different characteristics and degrees of severity may not require replacement until another 100 additional cycles of operation. Accordingly, the analysis associated with the crack can be used to determine not only a scope of work to be performed, but also the timing of that work. As previously described, logistics associated with the kitting operations in repairing the cracks may also be determined such that the parts and tooling associated with the crack repair workscope arrive at the servicing location at the correct time.

The data may also be incorporated into overall fleet models, allowing for adjustment of fleetwide workscope protocol(s). For example, if multiple engines show more wear than expected over time, the fleetwide workscope protocol may be updated to adjust servicing operations to address the accelerated wear rate, e.g., by adding an additional inspection step.

Figure 19:
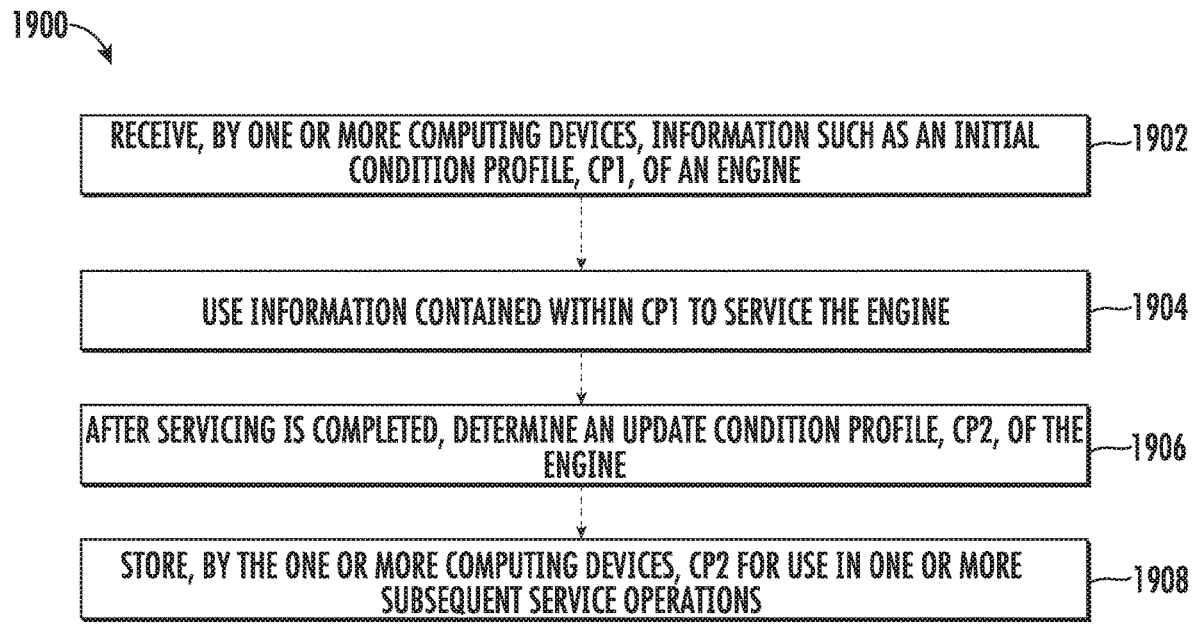
FIG. 19 is a flow chart of an exemplary method of servicing an engine using analytical profiles re-anchored in view of prior servicing operations in accordance with an exemplary embodiment of the present disclosure.

FIG. 19 illustrates a flow chart of an exemplary method 1900 of servicing an engine using condition profiles re-anchored in view of prior servicing operations. The method 1900 can include a step 1902 of receiving information including the initial condition profile, CP1, of the engine. In certain instances, the information can be received by one or more computing devices, such as the one or more computing devices 328 and/or 330 previously described. The method 1900 further includes a step 1904 of using the initial condition profile, CP1, to service the engine. That is, for example, information from CP1 can be used to determine a workscope of the equipment, to set threshold values for inspection, or the like. After servicing is complete, the method 1900 can include a step 1906 of determining an updated condition profile, CP2, of the engine. The step 1906 of determining CP2 can be performed in view of the service performed at step 1904 using CP1. For example, if servicing in view of CP1 resulted in a change to the thickness of a thermal coating, the updated thickness can be stored in the updated condition profile, CP2. Likewise, performance, condition, and the like of the engine can be considered in updating the condition profile. The method 1900 can further include a step 1908 of storing the updated condition profile, CP2, for use in subsequent service operations, such as a second service based on CP2 (and optionally CP1), a third service based on CP3 (determined as a result of the service in view of CP2), and so on.

Figure 23:
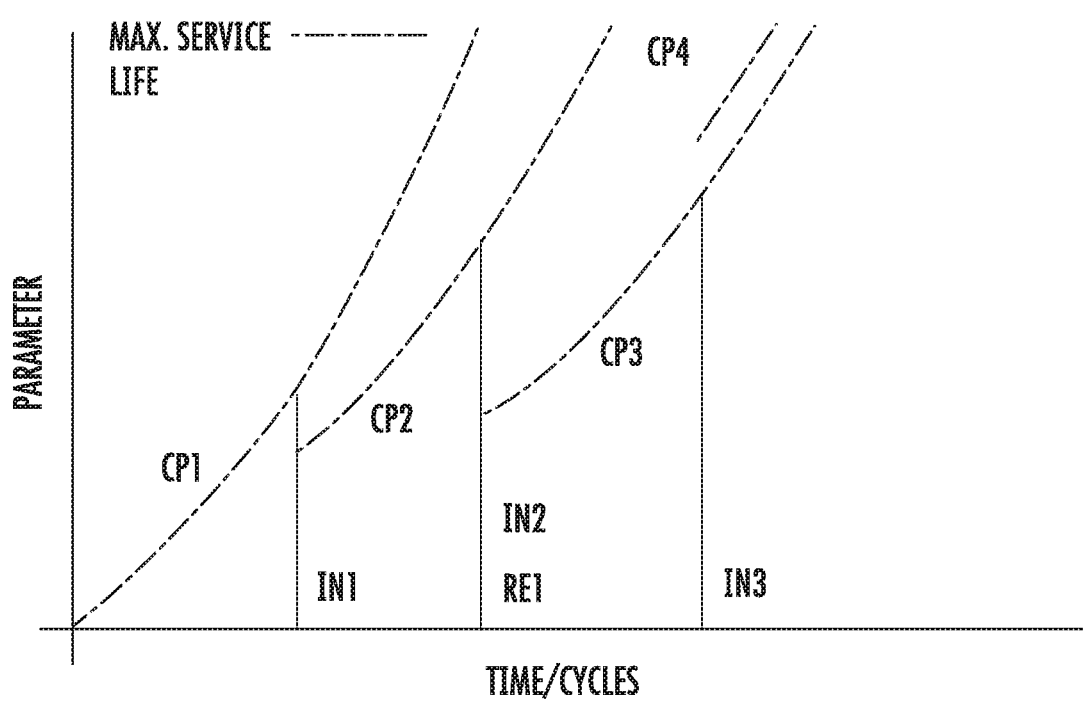
FIG. 23 is a graphical view of a re-anchoring protocol associated with a parameter of a gas turbine engine in accordance with an exemplary embodiment of the present disclosure.

FIG. 23 illustrates a graph depicting an initial condition profile, CP1, associated with a prediction of some engine parameter. The initial condition profile, CP1, parameter may be, for example, the maximum service life, as measured in time or cycles, remaining until a coating is predicted to reach failure. After an initial inspection, IN1, reveals that the coating is outperforming the predicted value provided by the initial condition profile, CP1, at the time or cycle associated with IN1, a new updated condition profile, CP2, can be generating which effectively updates the expected maximum service life, as measured in time or cycles, remaining until the coating is predicted to reach failure. After an additional inspection, IN2, again reveals that the coating is outperforming the predicted value provided by the updated condition profile, CP2, at the time or cycle associated with IN2, a further updated condition profile, CP3 can be generated which effectively updates the expected maximum service life, as measured in time or cycles, remaining until the coating is predicted to reach failure. This process can be repeated (e.g., IN3, CP4, etc.) until the expected failure date is determined to be outside of an acceptable safety range or other determinable range at which time repair can be performed or scheduled for a future date.

In an embodiment, the re-inspection process can look for foreign object debris (FOD) left in the engine. FOD may include, for example, material which did not originate in the engine. In another embodiment, the re-inspection process can look for domestic object debris (DOD) left in the engine, DOD may include, for example, materials from the engine which have moved and are found in a location where they should not be found. Examples include loose fasteners, chipped materials such as coatings, and the like.

The re-inspection process can include inspecting for repair equipment left near, on, or in the equipment by the robotic assembly 300. The repair equipment can include, for example, tooling, unused parts, wrappers and containers (e.g., associated with one or more parts used in the repair), repair accessories, and the like. In certain instances, the re-inspection can check for pieces of the repair equipment like broken off parts of the repair equipment which may be within the equipment. Checking for repair equipment left in the engine can include an initial step of capturing an initial view of the repair equipment, e.g., prior to the repair, and a secondary step of capturing a post view of the repair equipment, e.g., after the repair, and comparing the initial view with the post view. The comparison can be performed by the one or more computing devices 328 and/or 330. Upon detection of an unexpected event, e.g, the initial view and post view are different, an alert can be generated to check the equipment for the repair equipment. Checking the equipment can include scanning or viewing the equipment at one or more locations in search of the missing portion of the repair equipment.

As previously described, in certain instances, the servicing operation can be performed autonomously. An exemplary process for autonomous servicing operations includes the steps of performing an initial servicing operation which is monitored by the one or more computing devices through, for example, the environmental capture device 320, and determining whether successive operations relate to the initial servicing operation. For example, performing the initial servicing operation can include servicing the equipment within a provided workscope, monitoring the servicing operation, recording the servicing operation, and creating an autonomous servicing protocol in response to the monitored servicing operation. When a successive servicing operation is determined to relate to the workscope of the initial servicing operation, i.e., if the successive servicing operation is similar or the same as the initial servicing operation, the successive servicing operation can be performed autonomously in view of the autonomous servicing protocol. If the determined successive servicing operation does not relate to the workscope of the initial operation, the method can further include receiving an updated workscope, servicing the equipment within the provided updated workscope, monitoring an updated servicing operation, recording the updated servicing operation, and creating an updated autonomous servicing protocol associated with the updated workscope. In this regard, future servicing operations can then look to see if they relate to either the initial servicing operation or the updated servicing operation and select either autonomous servicing protocol accordingly or formulate a yet further updated autonomous servicing protocol.

FIG. 20 depicts an example implementation 2000 of a machine-learning model according to example embodiments of the present disclosure. The machine-learning model can utilize a machine learning algorithm. As shown, the one or more computing devices can provide input data 2002 to the model 2004. The input data 2002 can include the one or more inputs associated with the servicing operation. In some implementations, the input data 2002 can include the inspection results from the inspection operation. In other implementations, the input data 2002 can include repair results from the repair operation. In yet further implementations, the input data 2002 can include information associated with the inspection operation and the repair operation. The model 2004 can weigh the various inputs 2002 to determine one or more characteristics of the equipment being serviced, the servicing operation itself, workscopes (past, present, or future), fleetwide data, and the like. The one or more computing devices can receive, as an output of the model 2004, data 2006 indicative of the one or more characteristics of the equipment being serviced, the servicing operation itself, workscopes (past, present, or future), fleetwide data, and the like.

In some implementations, the output of the model 2004 (and/or the associated characteristics) for a given object (e.g., at a first time step) can be provided as an input to the model 2004 for another object (e.g., at a subsequent time step). In such fashion, fleetwide data can be processed and utilized to create fleetwide standards. Stated differently, in some implementations, the process can be iterative such that fleetwide data can be recalculated over time as it becomes clearer which servicing operations are required for the fleet. For example, the model 2004 can include one or more autoregressive models. In some implementations, the model 2004 can include one or more machine-learned recurrent neural networks. For example, recurrent neural networks can include long short-term memory recurrent neural networks, gated recurrent unit networks, or other forms of recurrent neural networks.

In some implementations, the machine learning computing system can train the machine-learned models through use of a model trainer. The model trainer can be implemented in hardware, firmware, and/or software controlling one or more processors. The model trainer can train the machine-learned models using one or more training or learning algorithms. One example training technique is backwards propagation of errors. In some implementations, the model trainer can perform supervised training techniques using a set of labeled training data. In other implementations, the model trainer can perform unsupervised training techniques using a set of unlabeled training data. The model trainer can perform a number of generalization techniques to improve the generalization capability of the models being trained. Generalization techniques include weight decays, dropouts, or other techniques.

In particular, the model trainer can train a machine-learned model based on a set of training data. The training data can include, for example, a number of sets of reference data obtained from previously observed servicing operations. In some implementations, reference data used to create training data can be taken from the same equipment, or the same type of equipment. In this way, the model can be trained to determine equipment information (e.g., workscopes) in a manner that is tailored to the equipment.

In some implementations, to train the model, a training computing system can input a first portion of a set of reference data into the model to be trained. In response to receipt of such first portion, the model outputs one or more output variables that predict the remainder of the set of reference data (e.g., the second portion of data). After such prediction, the training computing system can apply or otherwise determine a loss function that compares the one or more second portions of the data generated by the model to the remainder of the reference data (e.g., the second portion of data) which the model attempted to predict. The training computing system then can backpropagate the loss function through the model to train the model (e.g., by modifying one or more weights associated with the model).

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the equipment and/or robotic assembly can instead be performed at the equipment and/or robotic assembly, or vice versa. Such configurations can be implemented without deviating from the scope of the present disclosure.

Systems and methods described herein may be particularly advantageous for servicing equipment where preliminary workscopes inform autonomous servicing operations which can be autonomously, or semi-autonomously, modified or otherwise adjusted in response to autonomously observed information and data, and issues encountered during the servicing operation. Embodiments described herein may facilitate quicker servicing operations. Moreover, embodiments described herein may allow for improved servicing operations over time as a result of updated overall fleet models formed over the course of multiple successive servicing operations analyzed by one or more computing devices and/or human operators.

In certain instances, using systems and methods such as those described herein may reduce wasted life of parts and components of equipment, such as gas turbine engines. For example, hand inspections may result in premature repair operations as a result of higher safety factors associated with part failure. That is, without using robotic assemblies and/or autonomous processes such as those described herein for servicing operations and informing future servicing operations, certain aspects of the equipment may be replaced, repaired, or otherwise operated on before such operation is needed. By way of non-limiting example, certain coatings may be functionally satisfactory when examined by robotic assemblies described herein but fail human hand inspection. Accordingly, the frequency of replacement or repair to the coatings may be higher in hand servicing, which results in greater engine down time, increased costs, and reduced efficiencies.

It will be appreciated, that although for the exemplary embodiments and aspects described herein, the "environment" through which the exemplary robotic arm extends is described as a gas turbine engine, such as a turbomachine of a gas turbine engine, in other exemplary embodiments and aspects, the exemplary robotic arms described herein may extend through other suitable environments. For example, utilizing the systems and methods described herein, robotic arms may extend through hazardous environments, such as may be found in the nuclear industry, oil drilling industry, etc. Other environments are contemplated as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method of kitting a robotic assembly for servicing equipment, the method comprising: determining a current workscope associated with the equipment; determining one or more parts and tooling associated with the current workscope; equipping the robotic assembly with at least some of the determined parts and tooling; the robotic assembly autonomously navigating within a location corresponding with the equipment; and the robotic assembly autonomously performing at least one of inspection and repair of the equipment using the equipped parts and tooling.

A computer implemented method for preparing a robotic assembly for servicing equipment, the method comprising: determining, by one or more computing devices, a current workscope associated with the equipment; determining, by the one or more computing devices, parts and tooling associated with the current workscope; causing, by the one or more computing devices, at least some of the parts and tooling to be equipped on the robotic assembly; determining, by the one or more computing devices, a path for navigating the robotic assembly within a location corresponding with the equipment; and causing, by the one or more computing devices, the robotic assembly to autonomously perform at least one of inspection and repair of the equipment using the equipped parts and tooling.

A method of servicing equipment, the method comprising: determining a workscope associated with the equipment, the workscope including a plurality of tasks associated with at least one of inspection and repair of the equipment; determining a risk factor for at least two tasks of the workscope; and creating a queue of tasks in view of the determined risk factors, wherein tasks with higher risk factors are prioritized in the queue.

A method of servicing equipment, the method comprising: performing at least one of inspection and repair associated with a workscope of the equipment, wherein the at least one of inspection and repair comprises a queue of tasks to be performed; terminating the at least one of inspection and repair prior to completion of the queue; marking a stopping point identifying the location of termination relative to the queue and the equipment; and resuming at least one of inspection and repair beginning at the location of termination relative to the queue and equipment.

A computer implemented method for servicing equipment, the method comprising: receiving, by one or more computing devices, information including an initial condition profile, CP1, of the equipment; using information associated with CP1 to service the equipment; after servicing is completed, determining an updated condition profile, CP2, of the equipment; and storing, by one or more computing devices, information associated with CP2 for use in a subsequent service operation.

A method of servicing equipment, the method comprising: prior to performing a task associated with servicing the equipment, capturing and recording an original condition of the equipment; after performing the task, capturing and recording an updated condition of the equipment; comparing, using one or more computing devices, the updated condition of the equipment with the original condition of the equipment; and generating an alert when the updated condition deviates from the original condition by more than a preset threshold.

A method of preparing to service equipment, the method comprising: inspecting one or more components of the equipment; and comparing the inspected components of the equipment against reference data associated with the inspected components, wherein comparing the inspected component against reference data is used to: determine if tooling or parts to be used when servicing the equipment are properly sized and shaped to fit relative to the equipment during the service, and check for damage to the inspected components.

A computer implemented method for servicing equipment, the method comprising: recording aspects of the equipment during an nth service; storing, on one or more computing devices, the recorded aspects of the equipment during the nth service; recording aspects of the same equipment during an n+1 service performed at a different time than the nth service; storing, on the one or more computing devices, the recorded aspects of the equipment during the n+1 service; synchronizing the recorded aspects from the nth service with the recorded aspects from the n+1 service, wherein the synced aspects provide a service history of the equipment; and using the service history of the equipment, by the one or more computing devices, to autonomously inform aspects of future workscopes of the equipment.

A method of servicing equipment, the method comprising: autonomously inspecting components of the equipment for remaining longevity; and repairing one or more components of the equipment determined to have remaining longevity less than a duration of time until a next scheduled service, or generating a new workscope, or flagging a future repair.

A method of servicing equipment, the method comprising: recording information associated with the equipment at a first location; sending the recorded information to a node; receiving service input from an operator located at a second location different from the first location, the operator having prepared the service input in response to the recorded information on the node; and performing the service in view of the operator's input.

A computer implemented method for servicing equipment, the method comprising: recording information associated with the aviation equipment at a first location; sending, to one or more nodes, the recorded information; assessing, at a second location different from the first location, the recorded information from the one or more virtual nodes; preparing service input in response to the recorded information; and sharing, by the one or more computing devices, the prepared service input to the first location.

A robotic assembly for servicing equipment, the robotic assembly comprising: a kitting area configured to receive kitted components associated with a workscope of the equipment; an environmental capture device configured to capture one or more images of an environment in which the service equipment is disposed; and one or more computing devices configured to: locate the equipment in the environment, autonomously navigate the robotic assembly through the environment to the equipment, and autonomously adjust a position of the robotic assembly in response to the workscope.

A method of servicing equipment, the method comprising: receiving a workscope associated with the equipment; selecting one or more kitted components associated with the workscope, the one or more kitted components being disposed in one or more storage areas; loading the kitted components onto a robotic assembly; navigating the service equipment with the kitted components to the equipment; and autonomously performing the servicing operation with the robotic assembly using the kitted components.

A method of servicing equipment at an elevated temperature, the method comprising: navigating an autonomous robotic assembly to a location associated with the equipment; applying, from the robotic assembly, lubrication to one or more adjustable components of the equipment; waiting a duration of time; and with the robotic assembly, operating on the one or more adjustable components.

A robotic assembly for servicing equipment at an elevated temperature, the robotic assembly comprising: a robotic arm; a lubrication dispenser disposed on the robotic arm and configured to dispense lubrication to one or more fasteners of the equipment; and a wrenching device configured to operate on the one or more fasteners, wherein the robotic assembly is configured to autonomously operate on the one or more fasteners before the equipment cools to a threshold temperature at which human interaction is possible.

A robotic assembly comprising a lubrication dispenser and a wrenching device configured to autonomously operate on one or more fasteners of equipment at an elevated temperature, wherein the robotic assembly is configured to utilize temperature gradients between the one or more fasteners and the remainder of the engine so as to reduce torque requirements to unthread the one or more fasteners.

A method of detecting damage in equipment, the method comprising: observing a thermal response of the equipment during a transition between an elevated temperature and a lesser temperature; determining one or more thermal gradients in the equipment during the transition; comparing the one or more thermal gradients with one or more predetermined thermal gradient margins; determining when the one or more thermal gradients exceeds the one or more predetermined thermal gradient margins; and generating an alert when the one or more thermal gradients exceed the one or more predetermined thermal gradient margins.

A robotic assembly for detecting damage to equipment, the robotic assembly comprising: an autonomous platform configured to move through an environment containing the equipment; an environmental capture device coupled to the autonomous platform and configured to observe a thermal response of the equipment during a cooling duration occurring from an elevated temperature to a lesser temperature; and one or more computing devices configured to: from a information of the environmental capture device, determine cooling gradients in the equipment during the cooling duration, compare the cooling gradients with predetermined cooling gradient margins, determine when the cooling gradients exceed the predetermined cooling gradient margins; and generate an alert when the cooling gradient exceeds the predetermined cooling gradient margin.

A computer implemented method for detecting damage to equipment, the method comprising: receiving, by one or more computing devices, information from an environmental capture device, the information capturing thermal conditions of the equipment during a cooling duration occurring from an elevated temperature to a lesser temperature; determining, by the one or more computing devices, cooling gradients in the equipment during the cooling duration; comparing, by the one or more computing devices, the cooling gradients with predetermined cooling gradient margins; determining, by the one or more computing devices, when the cooling gradients exceed the predetermined cooling gradient margins; and causing to generate, by the one or more computing devices, an alert when the cooling gradient exceeds the predetermined cooling gradient margin.

A method of servicing equipment, the method comprising: receiving, by one or more computing devices, information corresponding to one or more components of the equipment; determining, by the one or more computing devices, a location of the one or more components of the equipment with respect to a location of an augmented reality device; and presenting, in a current field of view display of the augmented reality device, at least a portion of the information corresponding to the one or more components of the equipment.

A system for servicing equipment, the system comprising a memory storing processor-executable instructions and a processor to execute the processor-executable instructions to cause the system to: receive information corresponding to one or more components of the engine; determine a location of the one or more components of the equipment with respect to a location of an augmented reality device; and present, in a current field of view display of the augmented reality device, at least a portion of the information corresponding to the one or more components of the engine.

Autonomous robotic assembly configured to navigate relative to and service equipment, the autonomous robotic assembly comprising an environmental capture device, a memory storing processor-executable instructions, and a processor to execute the processor-executable instructions to cause the autonomous robotic assembly to service the equipment by: determining completed service tasks and yet-to-be-completed service tasks; maintaining an active log representative of a current step in servicing the equipment; moving relative to the equipment during service; and inspecting the equipment after the service.

A method of inspecting and repairing equipment, the method comprising: autonomously navigating a robotic assembly to the equipment using an environmental capture device of the robotic assembly; capturing feed of the equipment using the environmental capture device; comparing a current service task being performed on the equipment with a queue of tasks associated with the service of the equipment; determining completed service tasks and yet-to-be-completed service tasks; and marking a current location of service of the equipment.

An autonomous robotic assembly configured to service equipment, wherein the autonomous robotic assembly comprises an environmental capture device configured to provide information to one or more computing devices, wherein the one or more computing devices are configured to use the information to (i) autonomously navigate the robotic assembly within an environment containing the equipment, and (ii) service the equipment.

A method of servicing equipment, the method comprising: with respect to an initial operation of the equipment: servicing the equipment within a provided workscope; monitoring, by one or more computing devices, the servicing operation; recording, by the one or more computing devices, the servicing operation; and creating, by the one or more computing devices, an autonomous servicing protocol associated with the workscope; and with respect to a successive operation of the equipment: determining, by the one or more computing devices, if the successive operation relates to the workscope of the initial operation; and autonomously performing the servicing protocol if the successive operation is determined to be related to the workscope of the initial operation.

The method or assembly of any one or more of these clauses, wherein the equipment comprises aviation equipment.

The method or assembly of any one or more of these clauses, wherein the equipment comprises a gas turbine engine.

What is claimed is:

1. A method of servicing equipment, the method comprising:
    recording information associated with servicing the equipment in view of a workscope at a first location using an environmental capture device coupled to a robotic assembly;
    sending the recorded information to a node from a transceiver of the robotic assembly;
    receiving, at the robotic assembly, service input from a third party located at a second location different from the first location,. the third party having prepared the service input in response to the recorded information on the node, wherein the first and second locations are remote from one another by at least 0.25 miles;
    generating an updated workscope in view of the service input from the third party, and wherein performing a service using the received service input comprises performing the service in view of the updated workscope and based on the received service input; and
    completing the service using the received service input using a robotic arm coupled to the robotic assembly.

2. The method of claim 1, wherein the equipment comprises a gas turbine engine.

3. The method of claim 1, further comprising running a model to analyze the recorded information and sending information from the model to the node.

4. The method of claim 3, wherein running the model to analyze the recorded information comprises performing a component analysis of a component of the equipment to determine data indicative of a likelihood of failure of the component.

5. The method of claim 1, wherein the step of recording information associated with the equipment is performed by an at least partially-autonomous robotic assembly during a servicing operation using the environmental capture device coupled to the robotic assembly.

6. The method of claim 1, further comprising performing at least partial analysis of the recorded information prior to the third party receiving the recorded information.

7. The method of claim 1, wherein the recorded information includes visual information, analytic information, audible information, a digital model of a component of the equipment, or any combination thereof.

8. A computer implemented method for servicing equipment, the method comprising:
- receiving, via a node and at a computing device at a second location different from a first location, recorded information recorded by an environmental capture device of a robotic assembly at the first location, wherein the first location is at least 0.25 miles from the second location;
- preparing, via the computing device, service input in response to the recorded information; and
- sharing, via a communication device, the prepared service input to the first location using the node;
- causing, with the prepared service input, the robotic assembly to complete a service operation using the prepared service input.

9. The method of claim 8, wherein the service input is formed in view of one or more analytic models made at the first location and received at the second location.

10. The method of claim 8, wherein the equipment comprises a gas turbine engine.

11. The method of claim 8, wherein the computer implemented method is further configured to cause an at least partially-autonomous robotic assembly to complete the service in view of the service input.

12. The method of claim 8, wherein the step of preparing the service input is performed with a computer simulated environment informed by the recorded information.

13. The method of claim 8, wherein the step of preparing the service input is performed by a human, and wherein the steps of recording information and sending the recorded information are performed by an at least partially-autonomous robotic assembly.

14. A method of servicing an engine, the method comprising:
- at a service location, navigating a robotic assembly, autonomously, to the engine through a first location via an environmental capture device coupled to the robotic assembly, wherein the first location is within an autonomously navigable environment;
- inspecting the engine using the robotic assembly;
- autonomously capturing information associated with the inspection using the environmental capture device;
- at least partially-autonomously performing, using one or more computing devices, analysis on the information to create model information;
- sending at least one of the information and model information to an operator located at a second location, wherein the second location is at least 0.25 miles away from the first location, wherein sending the at least one of the information and model information to the operator includes at least partially-autonomously uploading the information to a node which is accessible to the operator; and
- at least partially-autonomously completing a repair of the engine at the service location in response to service input received from the operator.

15. The method of claim 14, further comprising re-inspecting the engine after performing repairs.

16. The method of claim 14, wherein the steps of inspecting the engine and at least partially-autonomously repairing the engine occur on successive days.

17. The method of claim 14, wherein the step of performing analysis on the information is performed with a computer simulated environment.

* * * * *

UNITED STATES PATENT AND TRADEMARK OFFICE
CERTIFICATE OF CORRECTION

PATENT NO. : 11,874,653 B2
APPLICATION NO. : 17/083658
DATED : January 16, 2024
INVENTOR(S) : Graham et al.

It is certified that error appears in the above-identified patent and that said Letters Patent is hereby corrected as shown below:

On the Title Page

Item (56), under "U.S. PATENT DOCUMENTS", in Column 2, Line 6, delete "Kastmp et al." and insert -- Kastrup et al. --, therefor.

In the Claims

In Column 48, Claim 1, Line 52, delete "location,." and insert -- location, --, therefor.

Signed and Sealed this
Ninth Day of April, 2024

Katherine Kelly Vidal
*Director of the United States Patent and Trademark Office*